(12) United States Patent
Ismert et al.

(10) Patent No.: US 12,286,774 B2
(45) Date of Patent: Apr. 29, 2025

(54) STUB-UP COUPLING SYSTEM

(71) Applicant: Sioux Chief Mfg. Co., Inc., Kansas City, MO (US)

(72) Inventors: Brian E. Ismert, Belton, MO (US); Cory Adams, Raymore, MO (US); Christopher J. Ismert, Kansas City, MO (US)

(73) Assignee: Sioux Chief Mfg. Co., Inc., Kansas City, MO (US)

( * ) Notice: Subject to any disclaimer, the term of this patent is extended or adjusted under 35 U.S.C. 154(b) by 361 days.

(21) Appl. No.: 18/155,570

(22) Filed: Jan. 17, 2023

(65) Prior Publication Data

US 2023/0228068 A1 Jul. 20, 2023

Related U.S. Application Data

(60) Provisional application No. 63/383,974, filed on Nov. 16, 2022, provisional application No. 63/266,895, filed on Jan. 18, 2022.

(51) Int. Cl.
| | |
|---|---|
| *E03B 7/09* | (2006.01) |
| *E03B 7/00* | (2006.01) |
| *E03B 7/07* | (2006.01) |
| *F16L 55/115* | (2006.01) |

(52) U.S. Cl.
CPC ............... *E03B 7/09* (2013.01); *E03B 7/003* (2013.01); *E03B 7/075* (2013.01); *F16L 55/1152* (2013.01)

(58) Field of Classification Search
CPC .. E03B 7/09; E03B 7/003; E03B 7/075; F16L 55/1152
See application file for complete search history.

(56) References Cited

U.S. PATENT DOCUMENTS

| | | | |
|---|---|---|---|
| 3,048,911 | A | 8/1962 | Almon |
| 3,285,289 | A | 11/1966 | Titus |
| 3,800,486 | A | 4/1974 | Harvey |
| 3,933,336 | A | 1/1976 | Tolf, Jr. |
| 4,261,598 | A | 4/1981 | Cornwall |
| 4,623,170 | A | 11/1986 | Cornwall |

(Continued)

FOREIGN PATENT DOCUMENTS

| | | |
|---|---|---|
| KR | 101726291 B1 | 4/2017 |
| WO | 2020198780 A1 | 10/2020 |

*Primary Examiner* — Benjamin R Schmitt
(74) *Attorney, Agent, or Firm* — AVEK IP, LLC; Kent R. Erickson

(57) ABSTRACT

A coupling system for plumbing applications including stub-ups in a poured slab. The coupling system includes a coupler and a cap. The coupler provides a glue-hub that is couplable to a stub-up. An opposite end of the coupler is enclosed by a knock-out disc that seals the end of the stub-up for pressure testing. A second glue-hub is provided beneath the knock-out disc. The cap includes a cap plate enclosing a top end thereof and is height adjustable on the coupler. A thermal expansion gap between the slab and the stub-up is provided by a sleeve positionable around the cap. The cap plate and the knock-out disc are "knocked out" to enable connection with the plumbing system and are sized to resist falling into the stub-up. An air purging valve may be installed in the coupler for pressure testing prior to removing the knock-out discs in the cap and coupler.

20 Claims, 14 Drawing Sheets

(56) References Cited

U.S. PATENT DOCUMENTS

| | | | |
|---|---|---|---|
| 5,072,911 A | 12/1991 | Logsdon | |
| 5,090,739 A | 2/1992 | Pollard | |
| 5,377,361 A | 1/1995 | Piskula | |
| 6,349,975 B1 | 2/2002 | Heil | |
| 6,637,464 B1 | 10/2003 | Cornwall | |
| 7,013,927 B2 | 3/2006 | Beaumont | |
| 7,055,184 B2 * | 6/2006 | Humber | E03D 11/16 4/252.4 |
| 7,278,450 B1 | 10/2007 | Condon | |
| RE42,909 E | 11/2011 | Julian et al. | |
| 10,344,472 B2 | 7/2019 | McConnell et al. | |
| 10,472,812 B2 * | 11/2019 | Condon | E03D 11/16 |
| 2009/0090078 A1 | 4/2009 | Smart et al. | |
| 2009/0230343 A1 | 9/2009 | Vansell et al. | |
| 2015/0292662 A1 | 10/2015 | Majocka et al. | |

\* cited by examiner

STUB-UP COUPLING SYSTEM

CROSS REFERENCE TO RELATED APPLICATIONS

This application claims priority to U.S. Provisional Application Ser. No. 63/266,895, filed Jan. 18, 2023, and titled "STUB-UP COUPLING SYSTEM," and to U.S. Provisional Application Ser. No. 63,383,974 filed Nov. 16, 2022, and titled "STUB-UP COUPLING SYSTEM".

BACKGROUND

In modern building construction, plumbing systems, such as wastewater systems, are often installed before or during the rough-in phase of construction of a structure and at least partially beneath the structure to allow connection to local water and sewage systems. For example, as depicted in FIG. 1, stub-ups 10 from such plumbing systems extend through and above the level of a concrete slab 12 that is poured around the stub-ups 10. Ends of the stub-ups 10 are temporarily closed off with a cap 14 glued on the end of the tube to allow pressure testing of the system and to prevent debris from getting in the line during construction. After the pour and finishing of the slab surface, the cap 14 is cut-off and a coupling with a glue hub for a section of pipe or a fitting is connected to the end of the remaining portion of the stub-up extending above the slab 12.

Finishing the slab surface is made difficult by the presence of the stub-ups 10 extending above the surface of the slab 12. Care must be taken to avoid dislodging, damaging or breaking the stub-ups 10 which can lead to significant repair costs among other issues.

In addition, some jurisdictions require an insulating sleeve 16 to be placed around the stub-ups 10 corresponding to the level and/or thickness of the slab 12. The sleeves 16 account for different rates of thermal expansion between the pipe and the concrete.

SUMMARY

A high-level overview of various aspects of exemplary embodiments is provided here to introduce a selection of concepts that are further described in the Detailed Description section below. This summary is not intended to identify key features or essential features of embodiments, nor is it intended to be used in isolation to determine the scope of the described subject matter. In brief, this disclosure describes a coupling system for a plumbing stub-up that enables pressure testing of an associated plumbing system and eases finishing tasks associated with a concrete slab in which the stub-up and coupling are disposed. The coupling system also prevents entrance of debris into the plumbing system and provides simple connection therewith when such phases of construction are reached.

In one embodiment, the coupling system comprises a cylindrical coupler having one open end configured to receive an end of a stub-up pipe and an opposite second end that is closed off by a knock-out panel or disc or closure member formed thereon. The coupler is preferably coupled to the stub-up pipe at a height generally corresponding to a planned height of a slab to be poured around the stub-up pipe such that the knock-out disc end of the coupler is generally even with a top surface of the poured slab. As such, the slab may be finished and construction activities above the slab may take place with reduced risks of dislocating or damaging the stub-up and without being impeded by the stub-up.

An interior of the coupler comprises a first glue-hub at the open end of the coupler, a second glue-hub separated from the first glue-hub by an abutment ridge, and a knock-out segment or space between the second glue-hub and the knock-out disc. The first glue-hub is configured to receive the end of the stub-up pipe. The abutment ridge may be formed circumferentially about the interior wall to provide a shoulder against which the end of the stub-up pipe may be abutted when inserted into the first glue-hub. The second glue-hub is configured to receive a pipe of a plumbing system of the structure being constructed on the slab.

The knock-out disc is formed at or adjacent to a terminal end of the coupler and encloses the terminal end of the coupler such that when installed on the stub-up pipe, the stub-up pipe end is enclosed and/or sealed to enable pressure testing and to prevent debris from entering. The knock-out disc includes one or more features such as a circumferential web or ring having a reduced or thinned thickness relative to the knock-out disc to enable the knock-out disc to be broken therealong and away from the remainder of the body of the coupler when connection to the plumbing system of the structure is required. The knock-out disc has a diametrical dimension that is greater than an inner diameter of the second glue-hub of the coupler but less than an inner diameter of the knock-out segment. The knock-out disc may thus be broken away or "knocked out" along the circumferential web of reduced thickness into the knock-out space and upon doing so, the dimensions of the knock-out disc are sufficient to prevent its entrance into the second glue-hub of the coupler or further passage into the stub-up pipe.

In one embodiment, the coupling system includes a cap that is engageable with the coupler and provides height adjustability to the system. The coupler is generally configured as described above and is additionally provided with one or more external features, like threads, ridges, grooves, or the like on an exterior circumferential surface thereof. The cap comprises a cylindrical body with one end thereof enclosed by a second knock-out disc. An interior surface of the cap is provided with one or more mating features configured to engage the external features of the coupler in a selectively adjustable manner. For example, the cap may be threadably engaged with the coupler and the length of the cap and coupler combination may be adjusted by rotation of the cap relative to the coupler. Accordingly, the coupler may be affixed to a stub-up and the cap may be selectively positioned relative thereto, by rotation of the cap relative to the coupler, to place the second knock-out disc generally level with an intended height of the slab to be poured therearound. The mating features may also provide resistance to unwanted or unintended adjustments between the cap and the coupler such as by engagement with detents or tabs or by frictional engagement. The second knock-out disc may be broken away or knocked out in a manner similar to that of the knock-out disc of the coupler when such phases of construction are reached.

In one embodiment, the coupling system includes a sleeve disposed on the cap or coupler that provides a gap between the cap, coupler, and/or the stub-up pipe and the slab poured therearound sufficient to accommodate differences in thermal expansion rates between the slab and the components of the coupler system and stub-up pipe. The sleeve comprises an elongate, open-ended, hollow cylinder or frusto-conical member having a length generally equal to or greater than a thickness of the slab. The sleeve is dimensioned to receive the cap and coupler within the interior thereof with the closed end of the cap being flush with or extending partially from one end of the sleeve. An exterior surface of the cap and an interior surface of the sleeve may include mating features that are engageable to affix the components together and/or to maintain their relative positions during pouring of the slab. The sleeve, if formed from plastic, is preferably frusto-conical to facilitate removal of the molded part from a mold in which it is formed.

In one embodiment, the coupling system includes a removeable pressure test assembly installed within the coupling system during construction for pressure testing the plumbing system. The pressure test assembly comprises a test valve, a gasket, and a float. When pressurized with a fluid comprising a liquid, gas, or a combination thereof, excess fluid in the system is evacuated via the pressure test assembly and the float is moved within the assembly to seal the system. The coupler and the cap are generally configured as described above and are additionally provided with fluid outlet openings in the knock-out disc and the second knock-out disc of the coupler and cap, respectively. The cap may have indicator whiskers or markers for locating the cap. As discussed above, the cap may be longitudinally adjusted relative to the coupler to adjust the second knock-out disc to a height generally level with the intended height of the slab to be poured therearound. The pressure test assembly is removable for reuse at the time when the second knock-out disc of the cap and the knock-out disc of the coupler are removed when such phases of construction have been reached.

Single or multiple coupling systems may be used in plumbing installations above the first floor. The coupling system, including the coupler and the cap configured to engage the coupler, are generally configured as described above. In one embodiment, a length of pipe approximately equivalent to an intended height of the concrete pour of the floor slab and with a radial dimension slightly smaller than an inverted coupler is received in the inverted coupler which is threadably engaged to an inverted cap secured to a subfloor. The inverted coupler and the inverted cap form a base of the coupling system located generally level with the intended bottom of the floor slab. A proximal end of the pipe is received in a glue hub of the inverted coupler adjacent to an open end of the inverted coupler and abuts an abutment ridge of the inverted coupler. The length of pipe extends in a generally upward direction from the inverted coupler and a distal end of the length of pipe is received within an upright coupling system, including an upright coupler threadingly engaged to an upright cap, the upright coupler and upright cap dimensioned to receive the length of pipe. The distal end of the pipe is inserted in the glue hub adjacent an open end of the upright coupler and abuts an abutment ridge of the upright coupler. As described above, the upright cap and/or the inverted cap may be selectively positioned relative thereto by rotation of the cap relative to the respective coupler to place a second knock-out disc of the upright cap generally level with the intended height of the slab to be poured therearound. The pressure test assembly may also be installed within the upright coupler. The knock-out disc and second knock-out disc of each of the inverted coupling system and upright coupling system are removed when such phases of construction have been reached. In one embodiment of the invention, the inverted cap coupled to the inverted coupler and/or the upright cap coupled to the upright coupler may be received by an intumescent sleeve for creating a firestop system.

A mounting flange or a flanged mount is an alternative base of the coupling system and comprises a cylindrical body or receiving end and a flange. The flange is configured to be mounted to a surface, such as a wood deck or metal deck, for floor-level installations of the coupling system. The cylindrical body, opposite the flange, is dimensioned to receive a coupler. An interior surface of the cylindrical body of the mounting flange is provided with one or more mating features configured to engage external features of the coupler in a selectively adjustable manner. The mounting flange may be threadably engaged with the coupler and the coupler may be adjusted by rotation of the coupler relative to the mounting flange. The mounting flange may include a ratchet feature for engaging or locking the coupler to the mounting flange at a desired height. In one embodiment, a proximal open end of an upright coupler may be fully to partially positioned within the mounting flange depending on a desired height of the coupling system and a cap may be adjustably installed at a distal end of the coupler. In another embodiment, an inverted coupler may be fully to partially positioned within the mounting flange. A proximal end of a length of pipe may be received within an open end of the inverted coupler and positioned to abut the abutment ridge of the inverted coupler and a distal end of the length of pipe may be received by an upright coupler, the distal end abutting an abutment ridge of the upright coupler. A cap may be adjustably installed in covering relationship with the upright coupler as described above.

DESCRIPTION OF THE DRAWINGS

Illustrative embodiments are described in detail below with reference to the attached drawing figures, and wherein.

DETAILED DESCRIPTION

Figure 1:
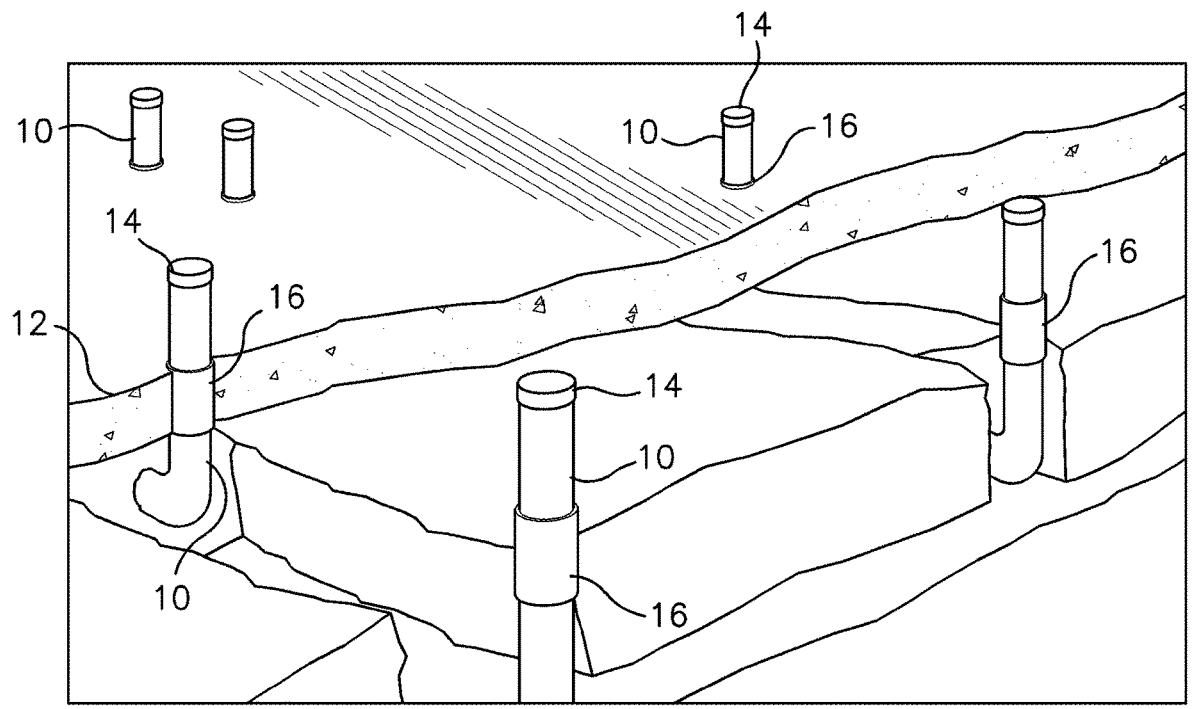
FIG. 1 is an illustrative view of a construction site depicting a concrete slab with plumbing stub-outs extending therethrough and partially cutaway to reveal additional stub-outs installed beneath the slab.

The subject matter of select exemplary embodiments is described with specificity herein to meet statutory requirements. But the description itself is not intended to necessarily limit the scope of embodiments. Rather, the subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by +/−10%, preferably by +/−5% and/or deviations in the form of changes that are insignificant to the function.

Exemplary embodiments are described herein with respect to the drawings in which reference numerals are employed to identify particular components or features. Similar elements in the various embodiments depicted are provided with reference numerals having matching second and third digits but with differing first digits, e.g. an element 10 is similar to elements 110, 210, etc. Such is provided to avoid redundant description of similar features of the elements but is not intended to indicate the features or elements are necessarily the same.

Figure 2:
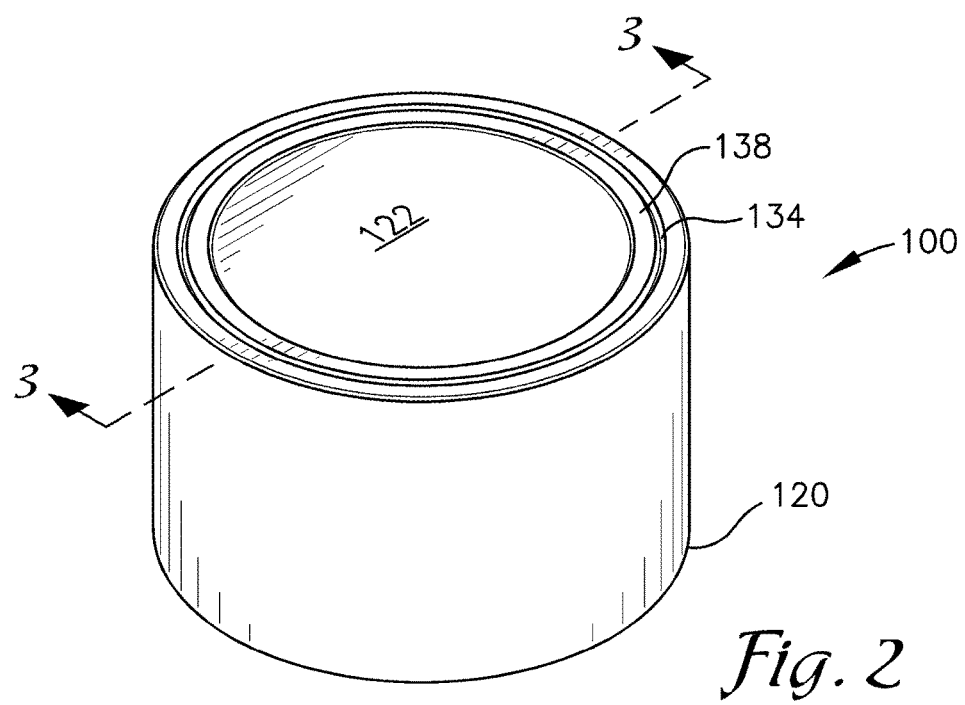
FIG. 2 is a perspective view of a stub-out coupling depicted in accordance with an exemplary embodiment.
Figure 3:
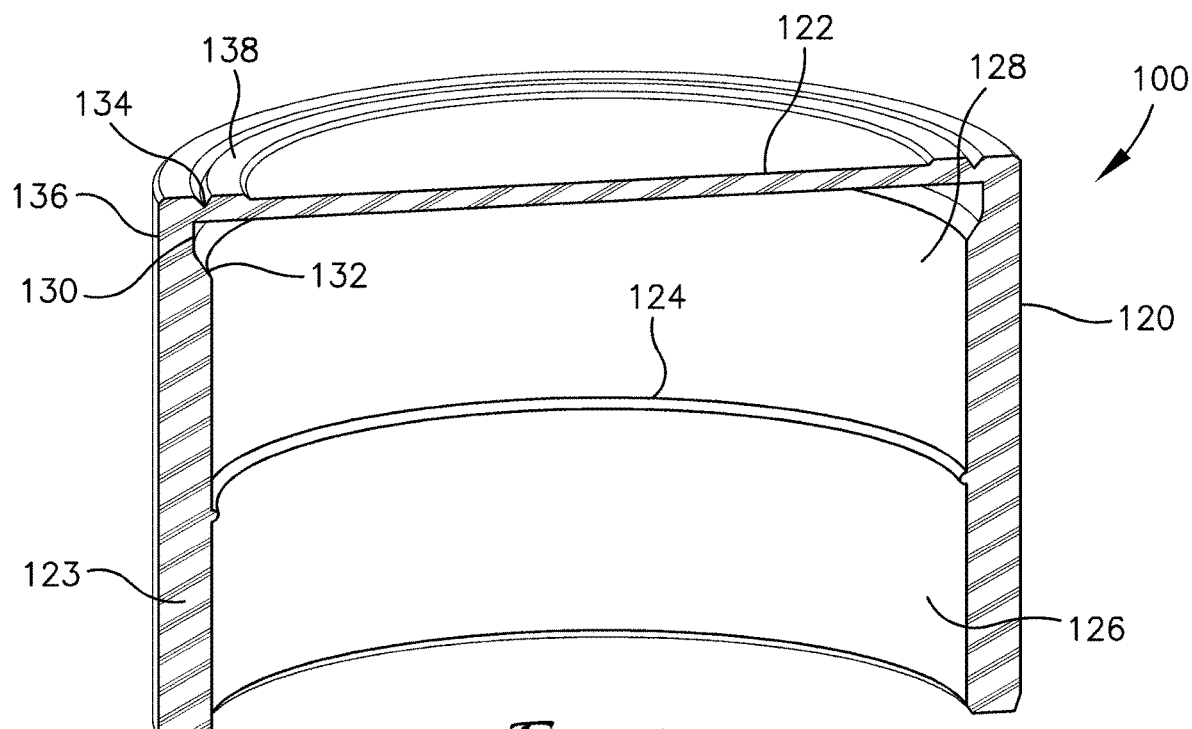
FIG. 3 is a perspective, cross-sectional view of the stub-out coupling of FIG. 2.
Figure 4:
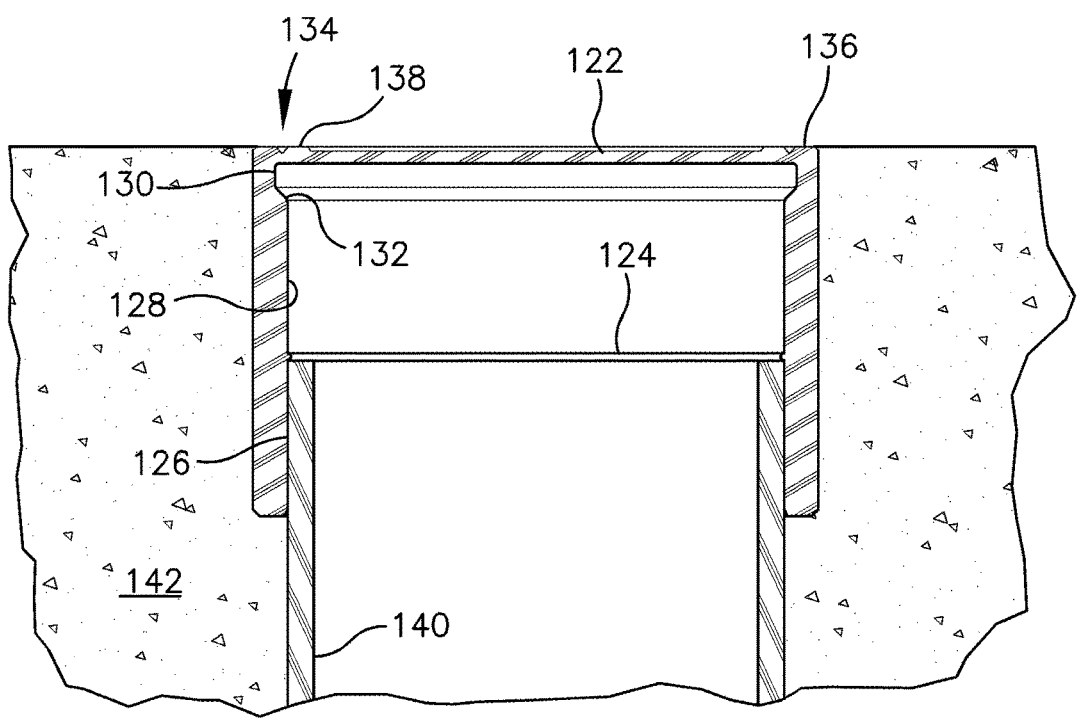
FIG. 4 is a cross-sectional view of the stub-out coupling of FIG. 1 installed on a pipe and within a concrete slab.

With reference to FIGS. 2-4, a coupling system 100 is described in accordance with an exemplary embodiment. The coupling system 100 is described herein with respect to its use on a stub-up for wastewater/sewage or drain-line plumbing for a structure like that depicted in FIG. 1, however it is understood that the coupling system 100 may be employed and/or adapted to a variety of other applications including other types of plumbing systems as well as phases and/or types of construction.

The coupling system 100 includes a coupler 120 configured as a hollow, cylindrical coupler body 121, with an open lower end and a knock-out disc or coupler knock-out member 122 extending across and enclosing or closing off an opposite upper end. The knock-out disc 122 may also be referred to as a coupler knock-out. The coupler body 121 is formed from a cylindrical wall 123 enclosing a hollow interior. An abutment feature, which is shown as an abutment ridge 124 in FIG. 3, is formed on an inner surface of the cylindrical wall 123 of the coupler body 121 generally midway along a length of the coupler body 121 and about an interior circumference thereof. The abutment ridge 124 defines and separates or divides a lower, first section or first glue-hub 126 and an upper, second section or second glue-hub 128 within the interior of the coupler 120. In the embodiment shown the abutment feature is shown as a continuous ridge but it is foreseen that the abutment feature could be discontinuous around the inner surface of the cylindrical wall 123. The abutment feature may also be of other geometries. For example, the abutment feature may be formed as a plurality of projections of a variety of shapes extending inward from the inner surface of the cylindrical wall 123 The lower and upper glue-hubs 126, 128 are each configured to receive an end of a pipe, such as the stub-up pipe and to be affixed thereto via, for example by gluing. In the embodiment shown, the upper and lower glue hubs 126 and 128 are of the same inner diameter. However, it is foreseen that the inner diameter of the first and second glue hubs 126 and 128 could vary.

The lower and upper glue-hubs 126, 128 may be configured to receive pipes of the same or different dimensions, formed from the same or different materials, and to couple with those pipes in the same or different manner. For example, the coupler 120 preferably joins two equally dimensioned polyvinyl chloride (PVC) pipes via gluing in a manner known in the art, but the coupler 120 might be otherwise configured to couple with one PVC pipe via gluing and another PVC, chlorinated polyvinyl chloride (CPVC) or an iron pipe via a threaded or bayonet-style coupling among a variety of other combinations that may be determined based on a particular application of the coupling system 100.

The upper glue-hub 128 extends along the length of the coupler 120 from the abutment ridge 124 to a knock-out section or space 130 that is defined or circumscribed by the interior wall of the coupler 120. The knock-out section 130 has a radial dimension that is larger than the radial dimension of the upper glue-hub 128 and thus forms a shoulder 132 at the junction between the knock-out section 130 and the upper glue-hub 128. The knock-out section 130 extends longitudinally from the upper glue-hub 128 to the knock-out disc 122 and/or to the terminal end of the coupler 120. The longitudinal length of the knock-out section 130 is substantially less than that of the upper and lower glue-hubs 128, 126 (which are substantially equal in length) but is sufficient to provide longitudinal space into which the knock-out disc 122 may be moved when the knock-out disc 122 is broken away or knocked out from the terminal end of the coupler 120. In one embodiment, the longitudinal length of the knock-out section 130 is between about 2 and about 3 times the thickness of the knock-out disc 122.

The knock-out disc 122 comprises a section of material extending across and enclosing the terminal end of the coupler 120. An outer circumferential edge or boundary of the knock-out disc 122 is defined by a break-away groove or web 134. The break-away groove or web 134 comprises a thinned section of material between the knock-out disc 122 and a sidewall 136 of the knock-out section 130 along which the knock-out disc 122 may be preferentially separated from the coupler 120 when a force is applied to the knock-out disc 122 as described more fully below.

A reinforcement rim 138 may be formed on the knock-out disc 122 just radially inward from the break-away web 134. The reinforcement rim 138 comprises a thicker portion of the knock-out disc 122 that may form a raised feature on an exterior face of the knock-out disc 122. The reinforcement rim 138 may aid preferential separation of the knock-out disc 122 from the coupler 120 along the break-away web 134 by acting to concentrate a force applied to the knock-out disc on the break-away web 134 and to strengthen the knock-out disc 122 adjacent to the break-away web 134. The reinforcement rim 138 may also provide a visual guide to a user to aid proper application of a force or blow to the knock-out disc 122 during removal thereof from the coupler 120.

With continued reference to FIGS. 2-4, installation and use of the coupling system 100 is described in accordance with an exemplary embodiment. Initially, a stub-up 140 is installed and readied for installation of the coupling system 100. The stub-up 140, like the stub-up 10 shown in FIG. 1 is typically installed during the rough-in phase of construction of the structure. Under known procedures, the stub-up 10 is provided with a vertical height or length configured to extend a distance (about 1-2 feet or about 0.5 meters) above an intended top surface level of a slab, such as a concrete slab, to be poured around the stub-up 10. In contrast, as shown in FIG. 4 in exemplary embodiments, the stub-up 140 is trimmed to a height that is less than the intended height of the top surface of a slab 142 to be poured around the stub-up 140. Preferably, the stub-up 140 is trimmed to a height that places the terminal end of the coupler 120 installed thereon (and/or the knock-out disc 122 thereof) substantially at the intended height of the poured slab surface.

The coupler 120 is installed on the trimmed stub-up 140 in a common manner by applying a gluing agent, like those known in the art, to an exterior surface of the stub-up 140 and the interior surface of the lower glue-hub 126. The stub-up 140 is then inserted into the lower glue-hub 126 and into abutment with the abutment ridge 124, as depicted in FIG. 4. Upon sufficient curing or setting of the gluing agent, the stub-up 140 is sufficiently sealed against entrance of debris into the stub-up 140 and may be pressure tested by common means. The slab 142 may now be poured around the stub-up 140 and up to the intended level which should be substantially level with the knock-out disc 122 of the coupler 120. The slab 142 may also be finished as desired, such as by sanding, polishing, staining, painting, or any other desired process without fear of damaging the stub-up 140 and without such activities being impeded by the stub-up 140 or coupler 120, e.g. the stub-up 140 and coupler 120 do not extend above the surface of the slab 142 and thus are not in danger of being contacted or struck by equipment or workers operating on the slab 142.

When connection of the plumbing system of the structure with the stub-up 140 is desired, the knock-out disc 122 is removed by applying a downward force thereon to break the knock-out disc 122 away from the coupler 120 preferably and preferentially along the break-away groove 134. The force is typically a plurality of strikes applied to the reinforcement rim 138 via a hammer or similar tool however other tools and/or force applications may be utilized. A cutting force or action might alternatively be applied along the break-away web 134 as desired. The knock-out disc 122 is preferably "knocked out" or broken away in a single piece. The radial dimension of the knock-out disc 122 is less than that of the knock-out section 130 of the coupler 120 such that the knock-out disc 122 can move/fall into the knock-out section 130. But, the radial dimension of the knock-out disc 122 is greater than that of the upper glue-hub 128 such that the knock-out disc 122 cannot fall or pass through the upper glue-hub 128. The "knocked out" knock-out disc 122 may thus be retrieved and removed from within knock-out section 130 by a user.

Connection of the stub-up 140 with the plumbing system of the structure is then completed by insertion of a connecting pipe through the knock-out section 130, into the upper glue-hub 128, and into abutment with the abutment ridge 124. The connecting pipe is glued or otherwise affixed to the coupler 120 in a common manner as described previously above with respect to the lower glue-hub 126.

With reference now to FIGS. 5-8, a coupling system 200 is described in accordance with another exemplary embodiment. The coupling system 200 comprises a coupler 220 and a cap 244. But for an external surface, the coupler 220 is configured substantially the same as the coupler 120 described above with a hollow cylindrical form having a knock-out disc or member 222 disposed at an upper end and an interior forming a lower glue-hub 226, an upper glue-hub 228, an abutment ridge 224 therebetween, and a knock-out section 230 between the upper glue-hub 228 and the knock-out disc 222.

Figure 21:
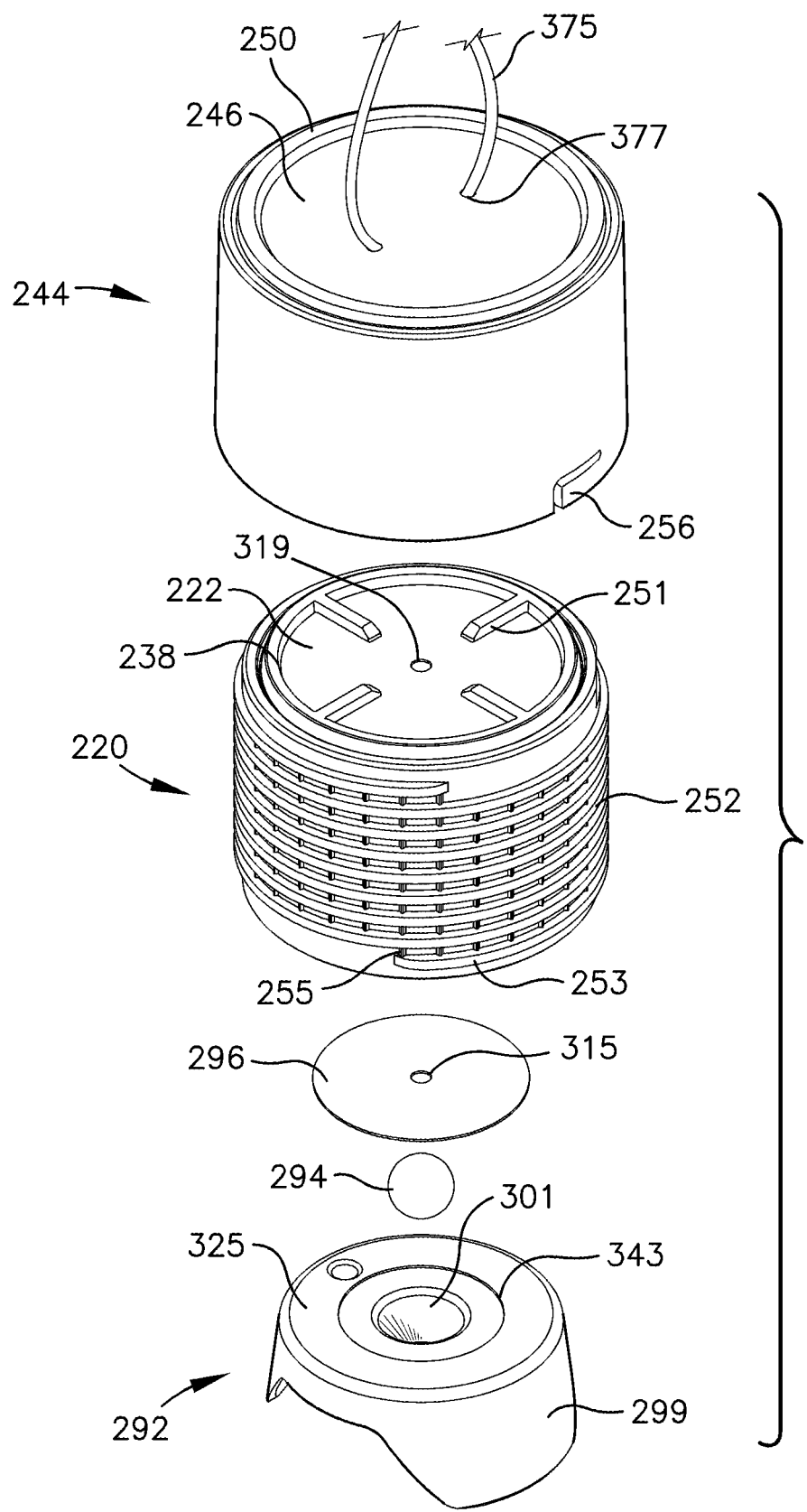
FIG. 21 is an expanded perspective view of the pressure test assembly of FIG. 14 depicted in accordance with an exemplary embodiment and including a coupling system modified for use with the pressure test assembly, the coupler including a purge hole for purging air and the cap including indicator whiskers installed through two marker holes.

The cap 244 also comprises a hollow cylinder formed by a cylindrical wall 245 with an upper end enclosed or closed off by a second knock-out disc, or cap knock-out member 246 and an open bottom end. An inner radial dimension or inner diameter of the hollow interior of the cap 244, surrounded by the cylindrical wall 245 of the cap, is just larger than an outer radial dimension or outer diameter of the coupler 220 to enable at least a portion of the coupler 220 to be disposed coaxially within the cap 244. The cap knock-out member or cap knock-out 246 is configured similarly to the coupler knock-out 222 to enable preferential separation or breakage away from the remainder of the cap 244 along a cap knock-out break-away groove or web 248 when a force is applied to the cap knock-out 246 in a manner similar to that described previously. The cap knock-out 246 may be reinforced and/or include one or more features, such as a cap knock-out reinforcement rim 250, to aid preferential breakage along the break-away groove 248 in a manner similar to the knock-out disc 222 of the coupler 220. In the embodiment in FIG. 21, the knock-out disc 222 of coupler 220 may include reinforcement rib members 251 extending from a reinforcement rim 238, as described above with respect to knock-out disc 122. The reinforcement rib members 251 extend toward the center of the knock-out disc 222 to further strengthen the knock-out disc 222.

An interior surface of the cap 244 and an exterior surface of the coupler 220 are provided with mating engagement features 252 that cooperate to enable adjustable engagement between the cap 244 and the coupler 220. As depicted in FIGS. 5-8, the engagement features 252 comprise mating threads that may be rotatably mated to provide a threaded engagement between the cap 244 and the coupler 220. The mating threads shown include an exterior thread 253 on an outer surface of the coupler 220 and an interior thread 254 on an inner surface of the cap 244 Such an engagement also enables the cap 244 and the coupler 220 to be adjusted relative to one another along a longitudinal axis by relative rotation thereof to adjust an overall longitudinal length of the coupling system 200. Although a threaded coupling is described herein, it is to be understood that other configurations may be employed for enabling adjustability of the longitudinal length of the coupling system 200 without departing from the scope described herein. For example, such an adjustable system might employ series of teeth or ridges on one component and one or more pawls on the opposite component or a bayonet-style engagement with one or more steps at various longitudinal distances or one or more frictional engagement components such as rubber O-rings or gaskets disposed between the cap 244 and coupler 220 might be employed, among a variety of other configurations.

Figure 5:
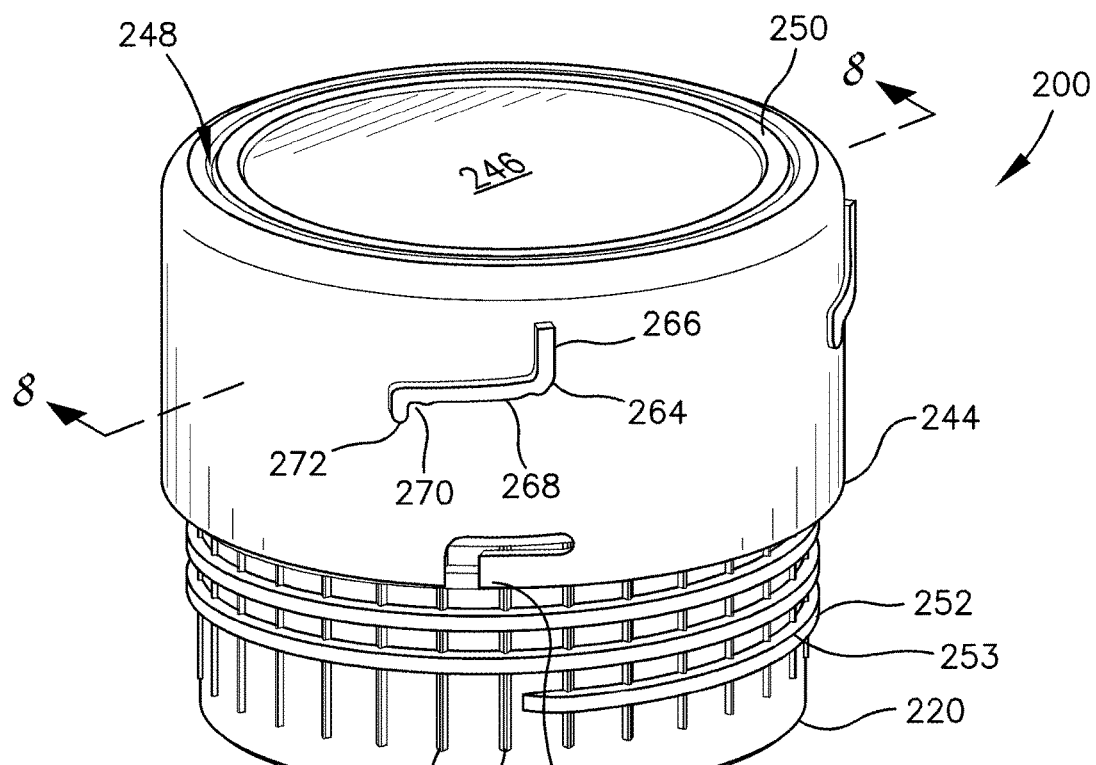
FIG. 5 is a perspective view of an adjustable stub-out coupling depicted in accordance with another exemplary embodiment.
Figure 7:
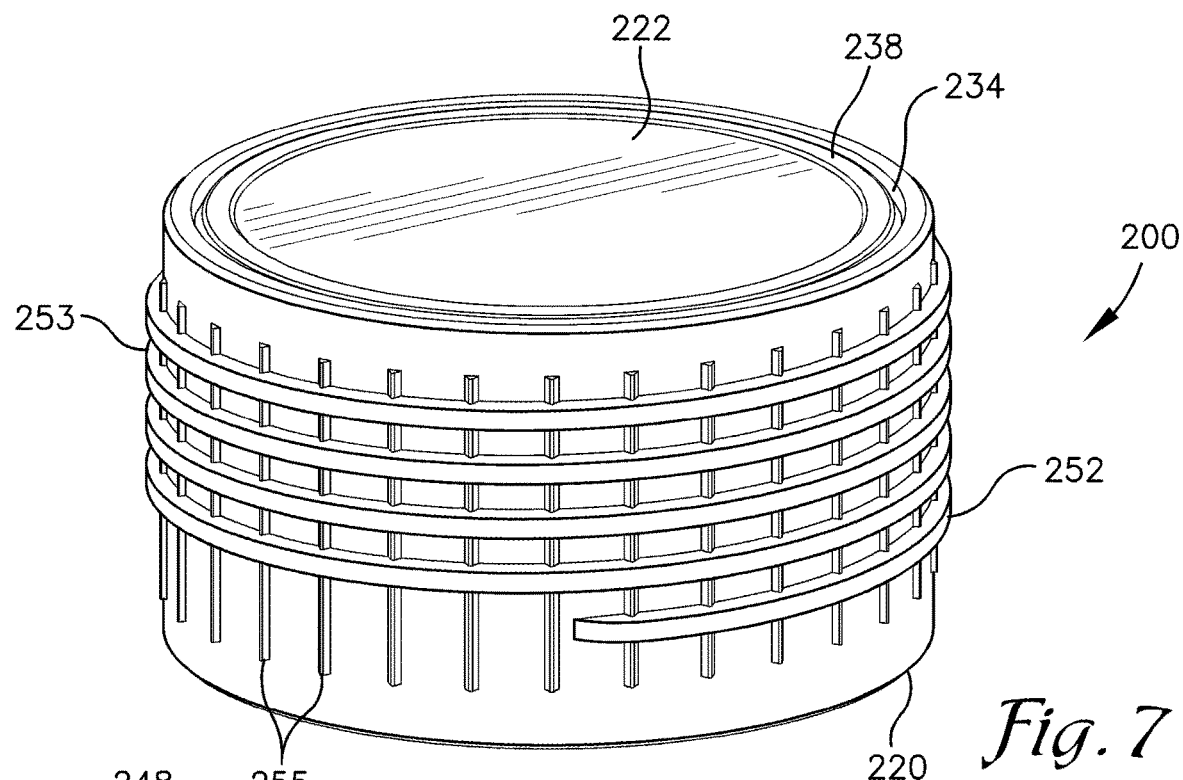
FIG. 7 is a perspective view of a coupler of the adjustable stub-out coupling of FIG. 5 depicted in accordance with an exemplary embodiment.
Figure 8:
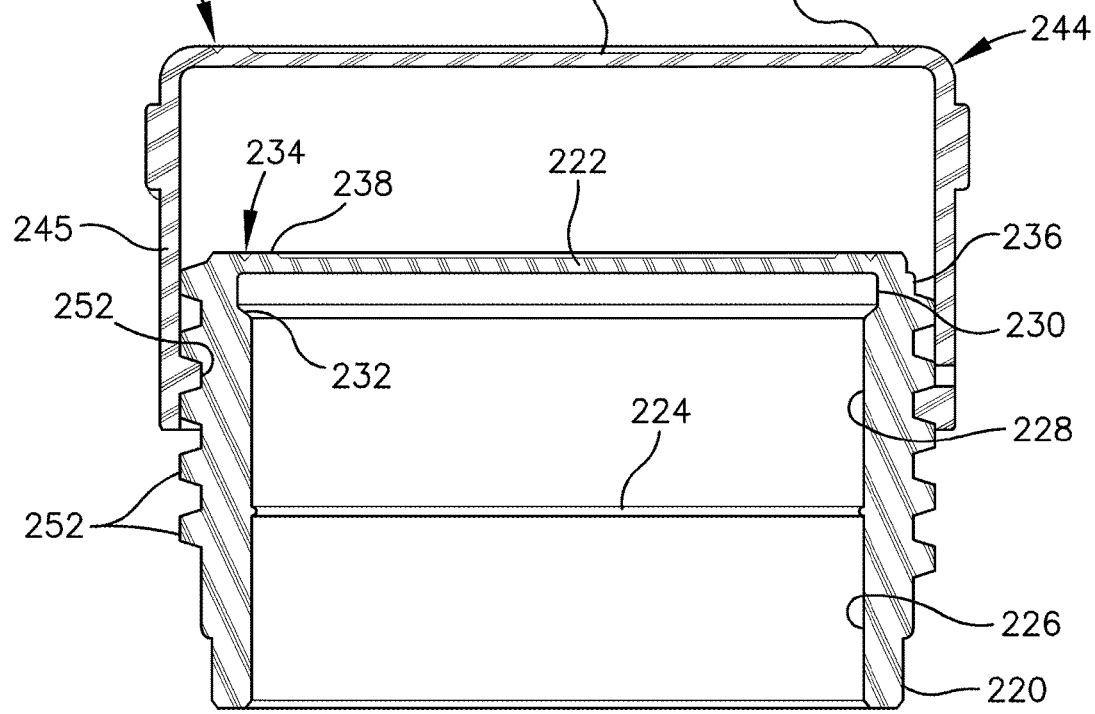
FIG. 8 is an elevational, cross-sectional view of the adjustable stub-out coupling of FIG. 5.
Figures 9, 10:
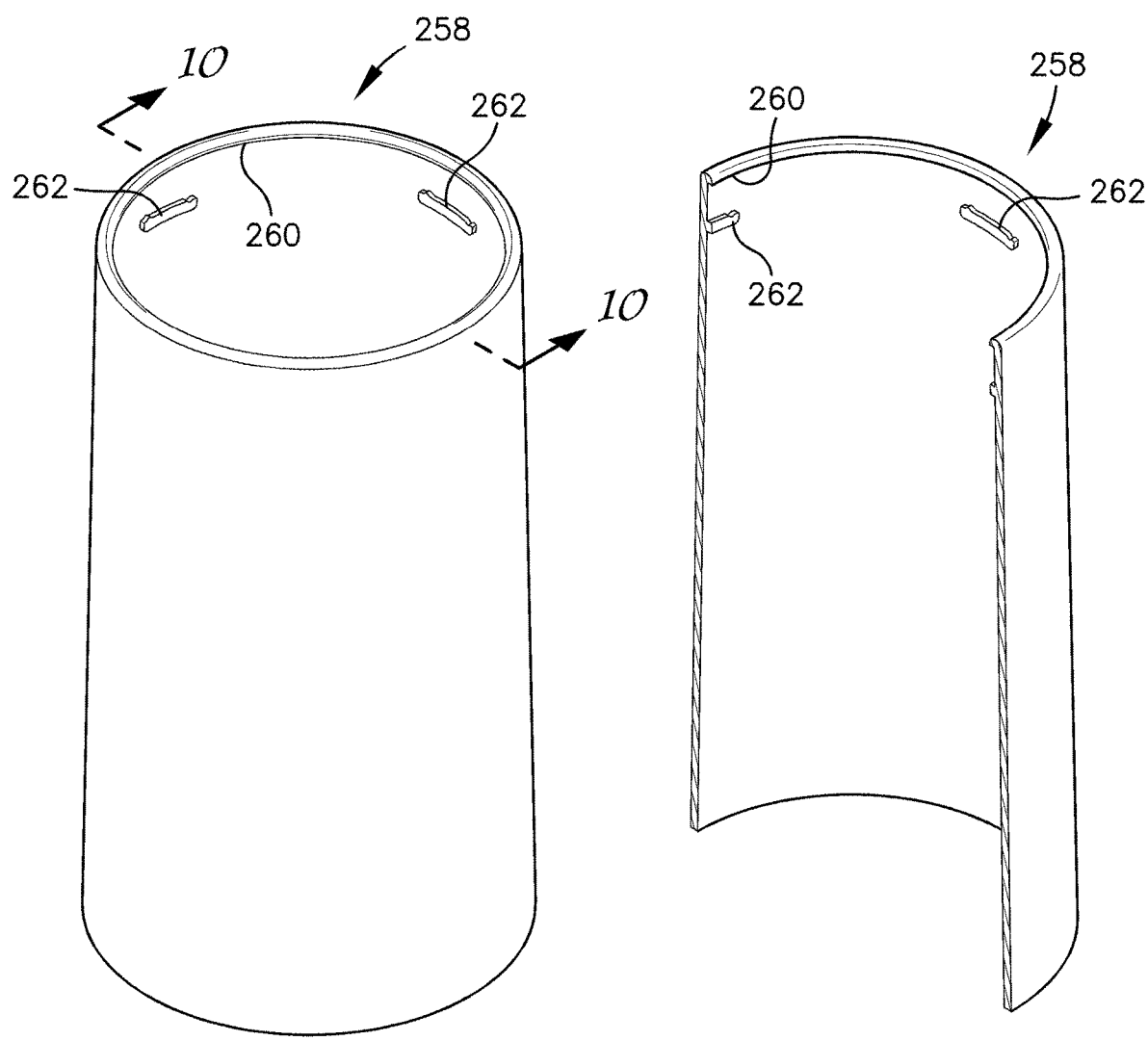
FIG. 9 is a perspective view of a thermal expansion sleeve depicted in accordance with an exemplary embodiment.
FIG. 10 is a cross-sectional view of the sleeve depicted in FIG. 9.

Locking features may be provided to resist adjustable movement of the cap 244 relative to the coupler 220 and/or to selectively lock the position of the cap 244 relative to the coupler 220. As depicted in FIGS. 5 and 7, the locking features comprise a plurality of longitudinal ribs 255 on an external surface of the coupler 220 and at least one flexible pawl 256 on the cap 244. In one embodiment, a flexible pawl 256 is provided on each opposite side of the cap 244. The ribs 255 shown extend in parallel and spaced apart alignment with a longitudinal axis of the cap 244. When the cap 244 and the coupler 220 are threadably coupled, the pawl 256 is biased against or toward the surface of the coupler 220. As the cap 244 is rotated relative to the coupler 220, the pawl 256 contacts the longitudinal ribs 255 to resist or prevent further rotation of the cap 244 until with application of sufficient rotational force causing the pawl 256 to be flexed away from the coupler 220 to enable the pawl 256 to pass by the rib 255 and the cap 244 to be rotated further.

With additional reference to FIGS. 9-13, the coupling system 200 may also include a thermal expansion sleeve 258 or skirt 258. The sleeve 258 comprises an elongate, hollow body which may be cylindrical or frusto-conical and having an interior radial dimension larger than that of the cap 244 and sufficient to receive the cap 244 and the coupler 220 coaxially within an interior thereof. In one embodiment, the sleeve 258 may be slightly flared out from end to end to provide a truncated conical or frusto-conical form with a diameter at a bottom end that is slightly larger than that at a top end. The radial dimensions of the sleeve 258 provide a gap 259 between the interior of the sleeve 258 and the cap 244, coupler 220, and stub-up 240 disposed therein. The gap 259 is sufficient to accommodate differences in thermal expansion/contraction of the slab 242 relative to the stub-up 240 as may occur during the life of the associated structure, such as with changing seasonal conditions and/or weather conditions. The longitudinal dimension or height of the sleeve 258 is approximately equal to or greater than the thickness of the slab 242 to be poured around the stub-up 240 and may thus generally prevent the stub-up 240 from being in direct contact with the slab 242.

The bottom end of sleeve 258 is open to allow insertion of the cap 244 therethrough. The top end of the sleeve 258 may include a radially inwardly projecting shoulder 260. The shoulder 260 defines an opening in the top end of the sleeve 258 having a radial dimension equal to or just larger than an exterior radial dimension of the cap 244 such that the shoulder 260 may abut or nearly abut the exterior of the cap 244. In one embodiment, the shoulder 260 defines an opening that is smaller in radial dimension than the exterior radial dimension of the cap 244 such that the shoulder 260 may at least partially rest on a top surface or edge of the cap 244.

In some embodiments, an interior surface of the sleeve 258 includes one or more projections 262 adjacent the upper end of the sleeve 258 and the cap 244 includes corresponding or mating projections 264 on an exterior surface thereof. The projections 262 may comprise pegs, nubs, flanges, or similar features extending radially inward from the interior sidewall of the sleeve 258 a distance sufficient to abut or nearly abut the exterior of the cap 244.

Figure 6:
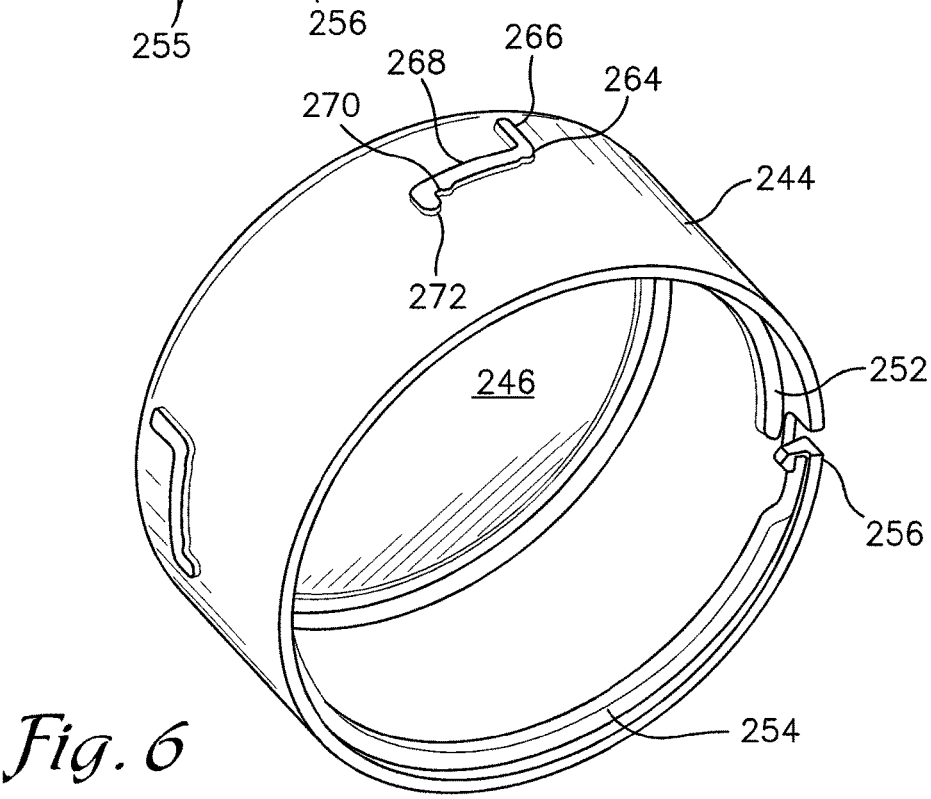
FIG. 6 is a perspective view of a cap of the adjustable stub-out coupling of FIG. 5 depicted in accordance with an exemplary embodiment.

As depicted in FIGS. 5 and 6, a plurality of projections 264 may be formed on an exterior surface of the cap 244. In the embodiment shown, each of the projections 264 is formed as a circuitous flange disposed about the perimeter of the cap 244. Each flange 264 includes a longitudinally extending section 266 followed by a transversely or circumferentially extending section 268 that may terminate with a detent 270 and a longitudinal stop 272.

In an alternate embodiment, it is contemplated that the sleeve 258 and the cap 244 may be integrated such that the cap 244 extends at least the height of the adjacent concrete slab 242.

With continued reference to FIGS. 5-13, installation and use of the coupling system 200 is described in accordance with an exemplary embodiment. Installation of the coupler 220 follows substantially the same process as described previously with respect to the coupler 120 of the coupling system 100 except that a stub-up 240 may be trimmed at a level that places a top terminal edge of the coupler 220 and/or the knock-out disc 222 (when installed on the stub-up 240) below an intended level of the slab 242 to be poured around the stub-up 240.

Following installation of the coupler 220 on the stub-up 240, the cap 244 is installed on the coupler 220 by inserting the top end of the coupler 220 into the open bottom end of the cap 244 and engaging the engagement features 252 therebetween. As shown in general in FIGS. 5-13, such engagement includes rotating the cap 244 relative to the coupler 220 to engage the outer and inner threads 253 and 254 provided by the engagement features 252. The cap 244 is rotated as needed to adjust the overall longitudinal length of the coupling system 200 and to place the cap knock-out 246 substantially at the intended level of the slab 242 to be poured around the stub-up 240. Upon attaining a desired height of the cap knock-out 246 the interaction of the longitudinal ribs 255 and the pawl 256 operate to resist further movement of the cap 244 relative to the coupler 220 and thus to maintain the height of the cap knock-out 246 during further construction activities and pouring of the slab 242.

It is contemplated that the cap 244 could be installed on the coupler 220 before the coupler 220 connected thereto is installed on the stub-up 240. When the cap 244 is installed on or connected to the coupler 220 prior to securing the coupler 220 to the upper end of the stub-up 240, the cap 244 may be threaded as far down onto the coupler body as possible to allow maximum height adjustability of the cap 244 relative to the coupler 220 and the upper end of the stub-up 240.

Adjustability of the length of the coupling system 200 provided by the engagement between the cap 244 and the coupler 220 thus reduces a need for precise trimming of the stub-up 240 while also enabling greater precision in the final height of the cap knock-out 246 to be achieved. Greater adaptability to changing circumstances in the construction is also provided. For example, if the stub-up 240 moves during construction or if the level of the slab 242 is slightly changed, the cap 244 may be adjusted to accommodate such changes. Further, in instances in which the stub-up 240 is trimmed and the coupler knock-out disc 222 is placed at the intended level of the slab 242, the cap 244 need not be employed.

Figure 12:
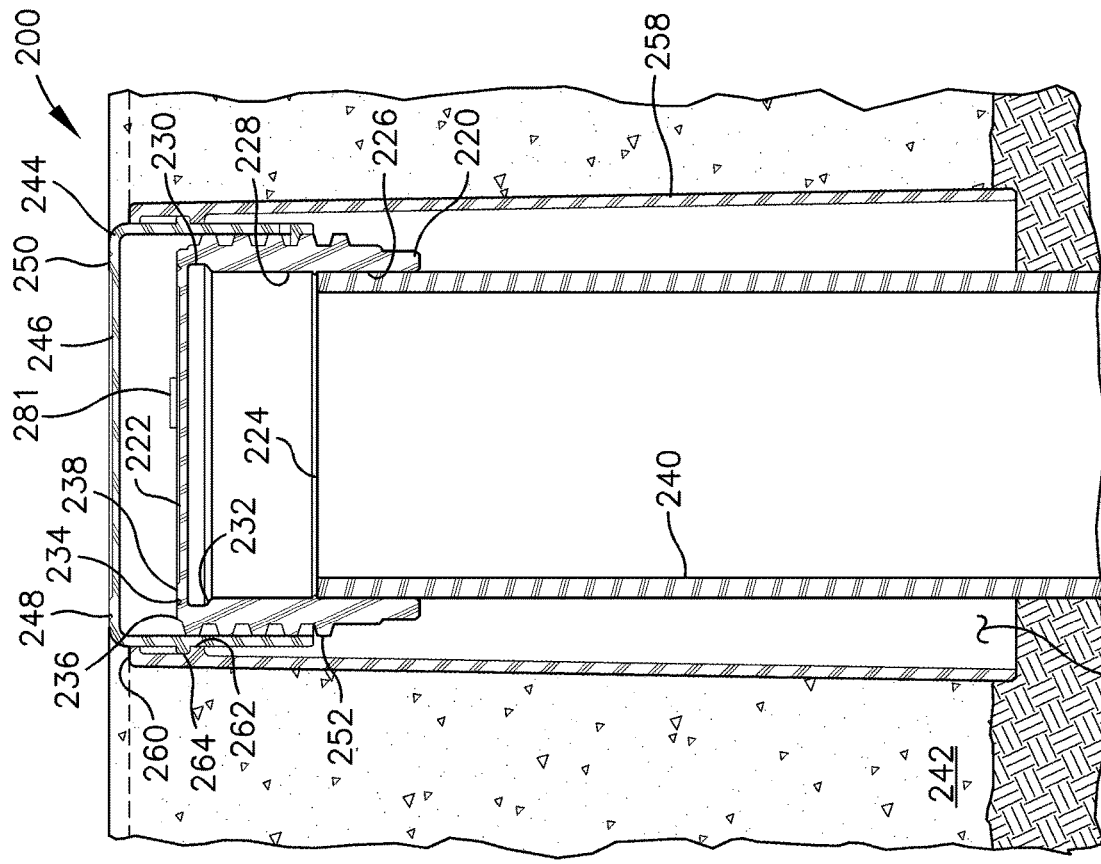
FIG. 12 is an elevational, cross-sectional view of the adjustable stub-out coupling of FIG. 11 installed on a pipe and within a concrete slab.
Figure 11:
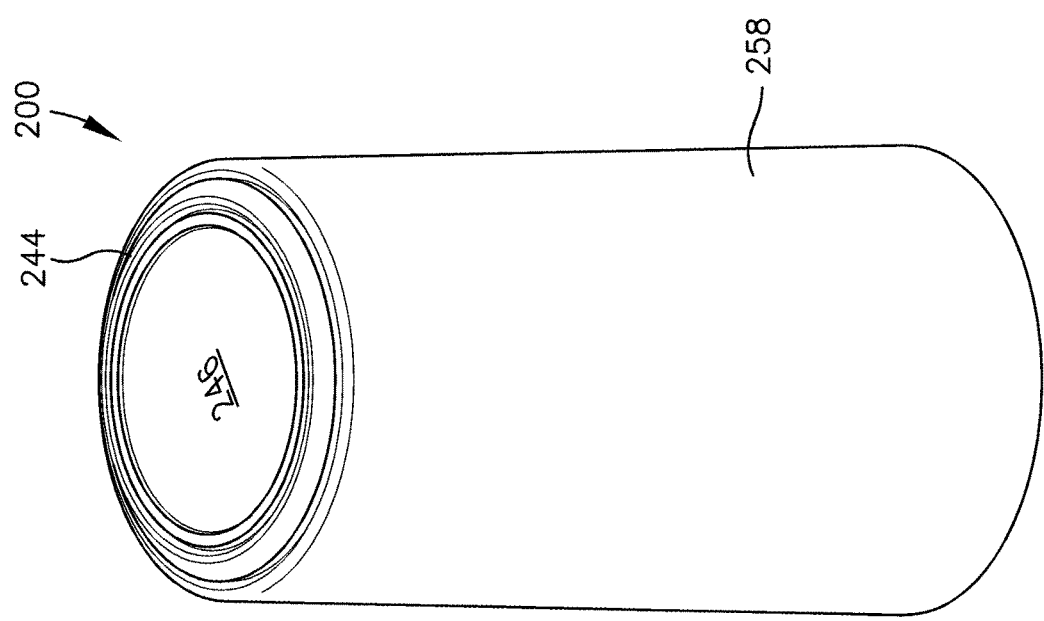
FIG. 11 is a perspective view of an adjustable stub-out coupling with the sleeve of FIG. 9 depicted in accordance with an exemplary embodiment.

As shown in FIG. 12, a locating device 281 may be placed in the space between the coupler knock-out 222 and the cap knock-out 246 prior to installing the cap 244 onto and over the coupler 220. The locating device 281 may be used with a locating tool (not shown) to assist in determining the location of the coupler 220 and cap 244 in situations where the upper surface of the poured slab 242 extends over the upper surface of the cap 244. The locating device 281 may comprise a magnet, a ferrous metal disc or an RFID chip or other type of locating device 281. If the locating device is an RFID chip the locating tool may be an RFID reader. If the locating device 281 is a magnet, the locating tool may be a magnet or magnetic field detector. If the locating device 281 is a ferrous metal disc, the locating tool may be a metal detector.

The locating device 281 may be placed on the coupler knock-out 222 after the coupler 220 is installed on the stub-up 240 and before the cap 244 is installed on the coupler 220. Alternatively, the locating device 281 can be positioned between the coupler 220 and the cap 244 before they are threadingly coupled together and before the coupler 220 is installed on the end of the stub-up 240.

Figure 13:
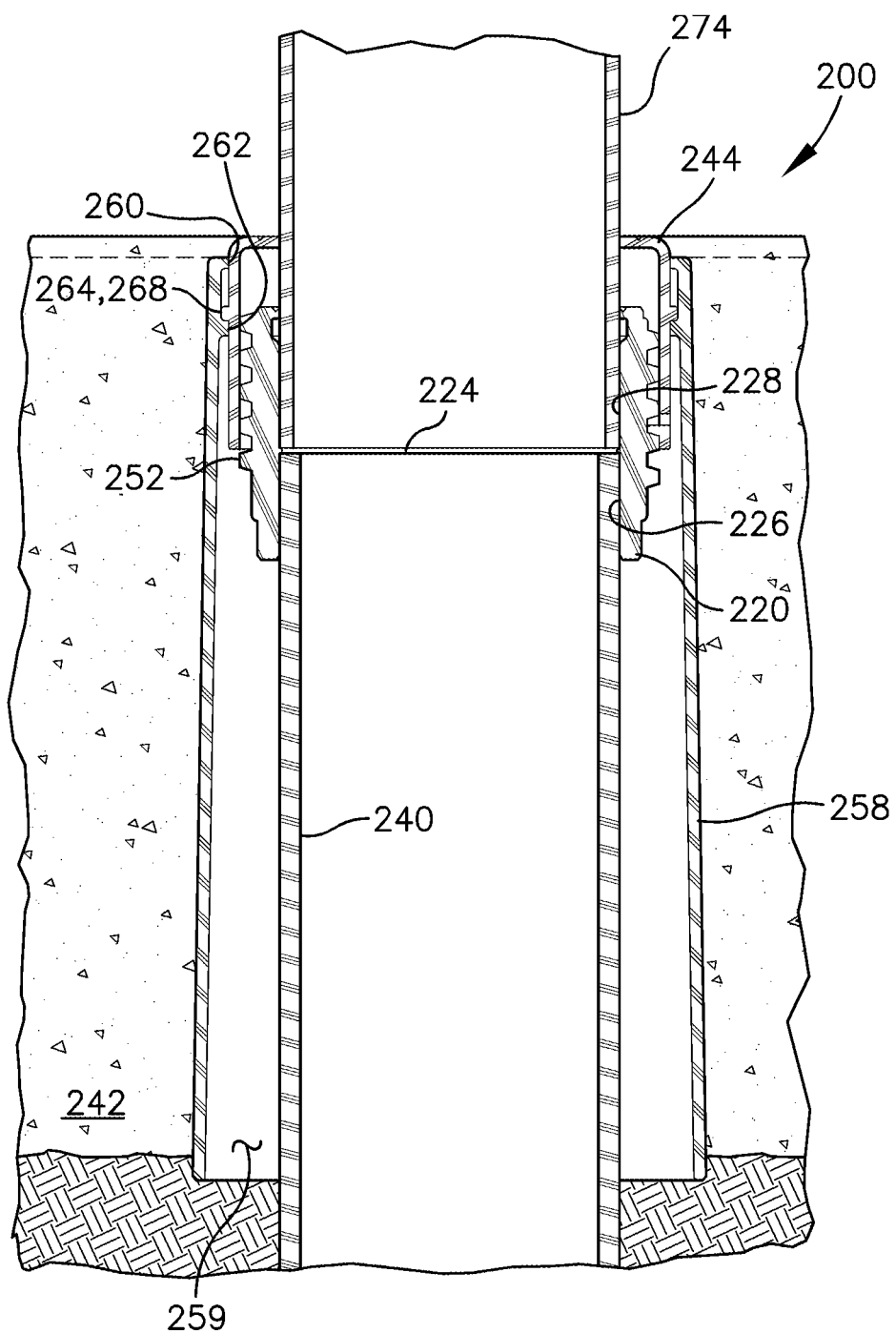
FIG. 13 is an elevational, cross-sectional view of the adjustable stub-out coupling of FIG. 11 in a fully installed condition.

After installation and proper adjustment of the cap 244 and when required by building codes or otherwise desired, the sleeve 258 may be installed on the cap 244. The sleeve 258 is installed over the cap 244 and moved downward to bring the cap 244 flush with or at least partially through the top end of the sleeve 258. The shoulder 260 of the sleeve 258 abuts or nearly abuts the surface of the cap 244 to resist entrance of debris therebetween. As depicted in FIGS. 12 and 13, interior to the sleeve 258, a bottom edge of the shoulder 260 is brought into contact with and rests upon and is supported by a top terminal edge of the longitudinally extending section 266 of the projections or flanges 264 on the cap 244. The sleeve 258 is rotated relative to the cap 244 to bring the projections 262 on the interior wall of the sleeve 258 beneath the transversely extending section 268 of the projections 264 on the cap 244 and to slide along the bottom edge of the section 268 and into contact with the longitudinal stop 272 and/or engagement with the detent 270. A spacing between the shoulder 260 and the projections 262 and/or dimensions of the projections 264 may be configured to provide a small amount of flexure, tension, and/or bias in one or more of the projections 262, 264 and/or the shoulder 260 to aid retention of the projections 262 in the detents 270 and thus maintain engagement between the sleeve 258 and the cap 244.

Following installation of the sleeve 258, the slab 242 may be poured. The knock-out disc 222 of the coupler 220 enables pressure testing of the plumbing system associated with the stub-up 240. The cap knock-out 246 prevents debris and/or concrete from entering the cap 244 and filling the void between the cap 244 and the coupler knock-out 222.

When it is desired to couple the stub-up 240 with plumbing systems of the structure, cap 244 is located and the cap knock-out 246 is then removed, broken away, or knocked out of the cap 244. If the upper level of the slab 242 extends over the cap 244, a locating tool may be used to locate the cap 244 if a locating device 281 has been inserted between the coupler 220 and cap 244. A hammer or the like may be used to break away any portion of the poured slab 242 extending over the cap 244. A downward force is then applied to the cap knock-out 246 to break the cap knock-out 246 away from the cap 244 preferably and preferentially along the cap knock-out break-away web 248. The force typically comprises a plurality of strikes applied to the reinforcement rim 250 via a hammer or similar tool however other tools and/or force applications may be utilized. A cutting force or action might alternatively be applied along the break-away web 248 as desired. The cap knock-out 246 is preferably "knocked out" or broken away in a single piece. The radial dimension of the cap knock-out 246 is less than that of the interior of the cap 244 such that the cap knock-out 246 can move/fall into a space between the cap 244 and the coupler knock-out 222 and/or the coupler 220. The radial dimension of the cap knock-out 246 is however greater than that of the coupler knock-out disc 222 to prevent or resist passage of the cap knock-out 246 through the coupler 220 and/or into the stub-up 240 if the coupler knock-out disc 222 where to be missing or damaged. The "knocked out" cap knock-out 246, and the locator device 281, may thus be retrieved and removed from within the space between the cap 244 and the coupler 220 by a user. The retrieved locator device 281 can then be used in subsequent projects.

Next, the knock-out disc 222 of the coupler 220 can be removed as described previously with respect to the coupler 120. Connection of the stub-up 240 with the plumbing system of the structure is then completed by insertion of a connecting pipe 274 through the opened end of the cap 244, the opened end of the coupler 220 and the knock-out section 230 of coupler 220, into the upper glue-hub 228, and into abutment with the abutment ridge 224. The connecting pipe 274 is glued or otherwise affixed to the coupler 220 in a common manner as described previously above.

Figure 14:
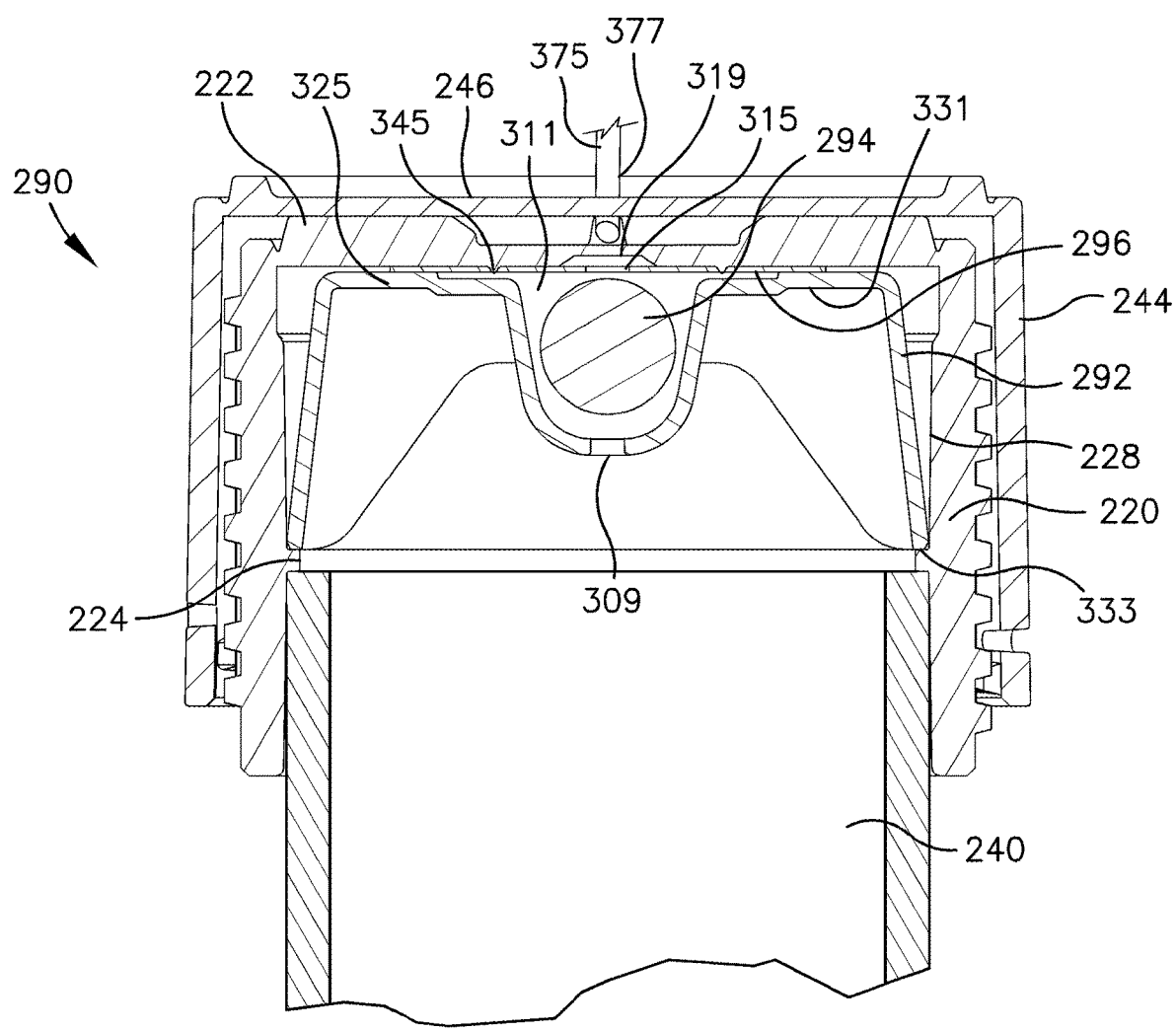
FIG. 14 is an elevational, cross-sectional view of a pressure test assembly depicted in accordance with an exemplary embodiment and installed in a modified embodiment of the adjustable stub-out coupling of FIG. 5 installed on a pipe.
Figure 15:
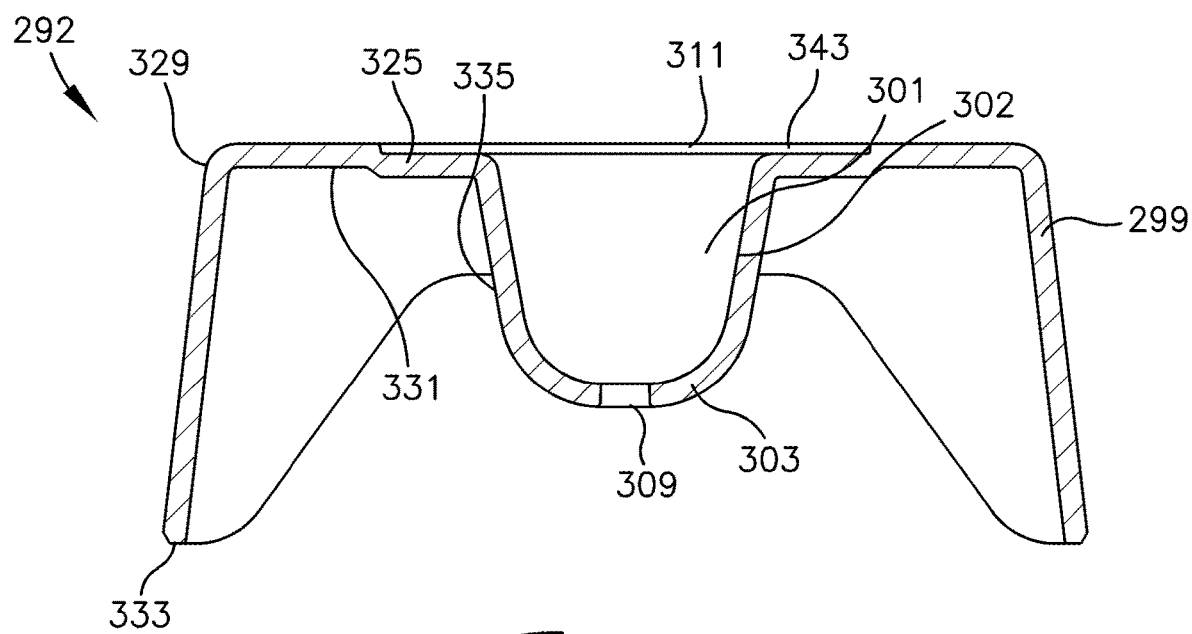
FIG. 15 is an elevational, cross-sectional view of the valve body of the pressure test assembly of FIG. 14 depicted in accordance with an exemplary embodiment.

With reference to FIGS. 14 and 15, a removeable and reusable pressure test insert or assembly 290 may be positioned within the coupler 220 for pressure testing the plumbing system during construction. The pressure test insert 290 forms a watertight seal between the stub-up 240 and the coupler 220 while allowing entrapped air to be purged from the stub-up 240 and released through the pressure test assembly 290 and past the coupler 220 as the stub-up 240 is filled with water. The pressure test assembly 290 includes a valve body 292, a float 294 and a gasket 296. The valve body 292 may be made from a resilient plastic and includes a cup or cone 302 depending from a center of an end wall 325 and a circumferential wall or peripheral wall segments 299 depending from the periphery of the end wall 325. A central cavity 301 is formed in the cup 302 which opens upward through the end wall 325. The cup 302 includes a lower cup or cavity wall 303 having a lower opening or aperture 309 extending therethrough with a diameter less than the diameter or width of the float 294. When installed in the coupler 220, the lower aperture 309 opens to the interior of the coupler 220. An upper opening or aperture 311 extends across the upper end of the cup 302. The diameter of the upper opening 311 is greater than the diameter or width of the float 294. The float 294 is formed to be less dense than water. In a preferred embodiment the float 294 is hollow and formed from polyethylene. The cavity 301 has dimensions to allow the float 294 to freely "float" within the cavity 301 during a pressure test from a position at the bottom of the cavity 301 to a sealing position at the top of the cavity 301.

The gasket 296 is positioned to extend across the end wall 325 of the valve body 292 and in covering relationship over the cavity 301. A central gasket opening 315 is formed through the gasket 296 at a center thereof and with a diameter smaller than the diameter or width of the float 294. As shown in FIG. 14, the pressure test assembly 290, including the valve body 292, the float 294 and the gasket 296, is seated within the upper glue-hub 228 of the coupler 220 having a purge hole or opening 319 for purging air formed therethrough. The pressure test assembly 290 is installed in the upper glue-hub 228 of the coupler 220 prior to the coupler 220 or coupling system 200 being installed on the stub-up 240 during construction.

The valve body 292 includes the cavity 301, the end wall 325 and cup 302 surrounding the cavity 301, and the peripheral wall segments 299 extending downward from the outer circumference of the end wall 325. In a preferred embodiment the valve body 292 has external dimensions equal to or just smaller than the upper glue-hub 228 of the coupler 220. As best shown in the figures, the upper aperture 311 is formed in the end wall 325. In one embodiment a lip may project laterally outward from the end wall 325, extending around the circumference of the end wall 325 complementary with the shape of the shoulder 232 of the coupler 220 formed between the knock-out section 230 and the upper glue-hub 228. As shown in the figures, the downward extending peripheral wall segments 299 of the valve body 292 are formed on and extend from a periphery 329 of the end wall 325 sloping toward the abutment ridge 224 of the coupler 220. The exterior radial dimensions of the peripheral wall segments 299 are just smaller than the corresponding interior dimensions of the coupler 220 to enable the valve body 292 to be disposed coaxially within the coupler 220 between the interior side of the coupler knock-out disc 222 and the abutment ridge 224. When installed in the coupler, a lower edge 333 of the peripheral wall segments 299 abut with the abutment ridge 224 of the coupler 220. During pressure testing of the plumbing system, a contact seal may be created between some of the exterior surfaces of the pressure test assembly 290 and interior surface the coupler 220.

The cup 302 including the lower cup wall 303 and cup or cavity sidewall 335 extends coaxially within the peripheral wall segments 299 of the valve body 292 to form the cavity 301. The cavity 301 formed in the end wall 325 includes the upper aperture 311 and the lower aperture 309. The lower aperture 309 is formed opposite the upper aperture 311 on the lower cup wall 303. The dimensions of the lower aperture 309 are less than the dimensions of the float 294, but great enough to allow evacuation of a liquid, gas, or a combination thereof during pressure testing of the plumbing system. The dimensions of the upper aperture 311 are greater than the dimensions of the float 294 such that the float 294 may be deposited in the cavity 301 via the upper aperture 311 prior to installation of the pressure test assembly 290 in the coupler 220. The top of the valve body end wall 325 has a sealing groove or a depression 343 circumscribing the upper aperture 311 that is sized and configured to receive a ridge 345 on the interior of the knock-out disc 222 of the coupler 220 with the gasket 296 compressed between the ridge 345 and the portion of the end wall 325 in which the ridge 345 is received as discussed below.

In one embodiment, the valve body 292 is formed as a single plastic or elastomeric body. As shown in the figures, the bottom wall of cup 302 extends radially upward and outward from the lower cup wall 303 toward a lower surface 331 of the valve body 292. The peripheral wall segments 299 generally have a uniform outside diameter while the width of the peripheral wall segments 299 may increase from the lower edge 333 to the top of the peripheral wall segments 299.

The gasket 296 is installed between the end wall 325 of the valve body 292 and the inner surface of the knock-out disk 222 of the coupler 220. In a one embodiment the gasket 296 is dimensioned to cover the valve body end wall 325. The central gasket opening 315 is formed in the center of the gasket 296 and is axially aligned with the lower aperture 309 and the upper aperture 311 of the cavity 301. The central gasket opening 315 is smaller in dimension than the upper aperture 311 and the float 294 such that when the pressure test assembly 290 is installed and the plumbing system is pressurized, air is purged through the gasket hole until the float 294 is "floated" to seal the central gasket opening 315. In a preferred embodiment, when the central gasket opening 315 is sealed by the float 294, the associated stub-up 240 of the plumbing system of the structure is sealed. The gasket 296 is held in place between the valve body 292 and the coupler 220 through pressure.

Figure 23:
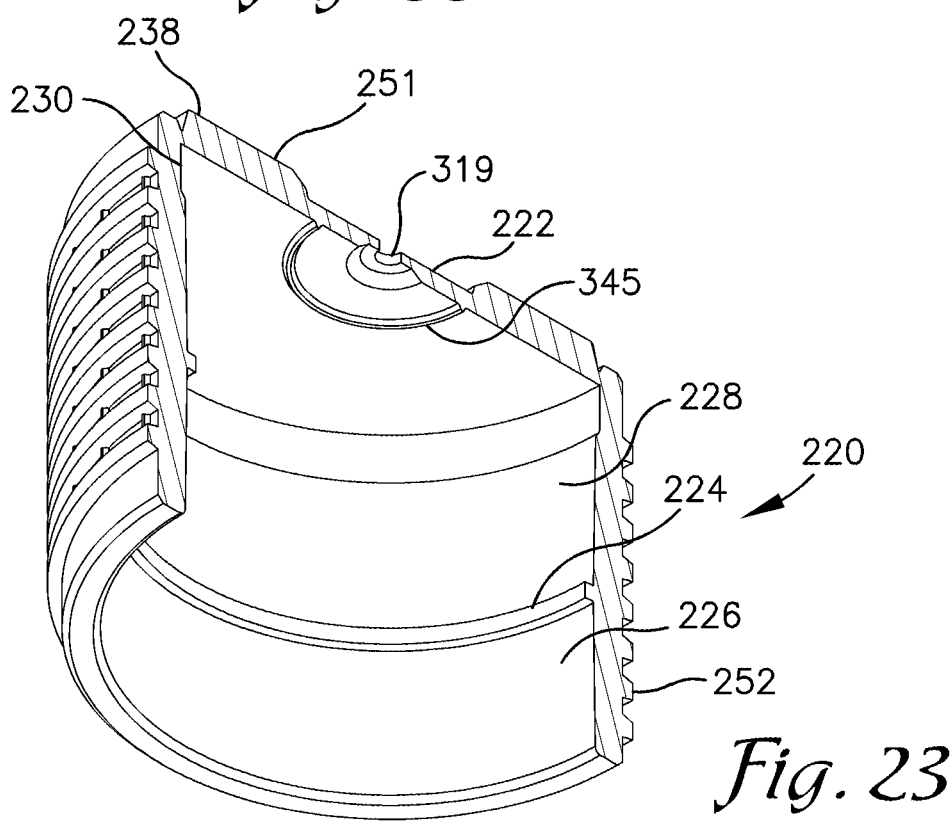
FIG. 23 is a cross-sectional view of the coupler adapted for use with the pressure test assembly of FIG. 14 depicted in accordance with an exemplary embodiment, the coupler having an opening for purging air, a ridge on an interior of a knock out disc and an abutment ridge between an interior upper glue hub and a lower glue hub.

The coupler 220 is described above but is adapted with the purge hole 319 in the knock-out disc 222 for purging air during pressure tests of the plumbing system. In a preferred embodiment, the purge hole 319 is aligned with and shares a central longitudinal axis with the central gasket opening 315, the upper aperture 311, and the lower aperture 309 of the cavity 301. In a one embodiment shown if FIG. 23, the interior side of the knock-out disc 222 has the ridge 345 circumscribing the purge hole 319 and pressing the gasket 296 into the groove 343 on the valve body end wall 325. In one embodiment, the ridge 345 is a v-shaped ridge that mates with a v-shaped groove 343 on the end wall 325. The gasket 296 may be formed from a material, such as silicone, that seals the space between the ridge 345 and the groove 343. The shapes of the ridge 345 and the groove 343 may be designed to reinforce the seal of the pressure test assembly 290 to the coupler 220 during pressure testing of the plumbing system.

In a preferred embodiment, a cap 244 as described above is installed on the coupler 220 into which one of the pressure test assemblies has been inserted. As described above, the cap 244 is selectively positioned relative to the coupler 220 to place the second knock-out disc 246 generally level with an intended height of the slab 242 to be poured therearound. In one embodiment, indicator whiskers or markers 375 are installed through two marker holes 377 formed in the second knock-out disc 246 and the indicator whiskers 375 may extend upward or away from the stub-up 240. The indicator whiskers 375 may be formed from a length of weed eater string or other strands that may be contemplated by a person skilled in the art. The purge hole 319 of the coupler 220 and the marker holes 377 in the cap 244 allow entrapped air to be purged from the stub-up 240 of the plumbing system during pressure testing. Entrapped air may also be purged from between the mating engagement features 252 of the cap 244 and the coupler 220.

With continued reference to FIGS. 14 and 15, installation and use of the pressure test assembly 290 is described in accordance with an exemplary embodiment. The pressure test assembly 290 may be installed into any of the presented embodiments of the present invention. The pressure test assembly 290 is installed into the coupler 220 or the coupling system 200 prior to installation of the coupler 220 or the coupling system 200 on the stub-up 240. Installation of the pressure test assembly 290 includes inserting the float 294 within the cup 302 of the valve body 292, covering the end wall 325 of the valve body and the cup 302 with the float 294 positioned therein with the gasket 296 and then seating the gasket 296 and the valve body 292 with the float 294 positioned within the cup 302 of the valve body 292 within the upper glue-hub 228 between the knock-out disc 222 and the abutment ridge 224. In one embodiment, indicator whiskers 375 are threaded through the two marker holes 377 located in the second knock-out disc 246 of the cap 244 prior to positioning the cap 244 onto the coupler 220, as described above. Installation of the coupler 220 or coupling system 200 on the stub-up follows substantially the same process as described previously. The stub-up is trimmed to a length that places a top terminal edge of the coupler 220 or the coupling system 200 at approximately an intended level of the slab to be poured. A pressure test, as is known in the art, is then executed. After the pressure test the slab 242 is poured and finished, and the second knock-out disc 246 and the knock-out disc 222 is removed as described previously with respect to the coupling system 200. The pressure test assembly 290 is then retrieved and removed from the coupler 220 and may be used in subsequent projects or disposed.

Connection of the stub-up 240 with other sections of the plumbing system of the structure is then completed by insertion of a connecting pipe through the opened end of the cap 244, the opened end of the coupler 220 and the knock-out section 230 of the coupler 220, into the upper glue-hub 228 and into abutment with the abutment ridge 224. The connecting pipe is glued or otherwise affixed to the coupler 220 in a common manner as described previously above.

Figure 16:
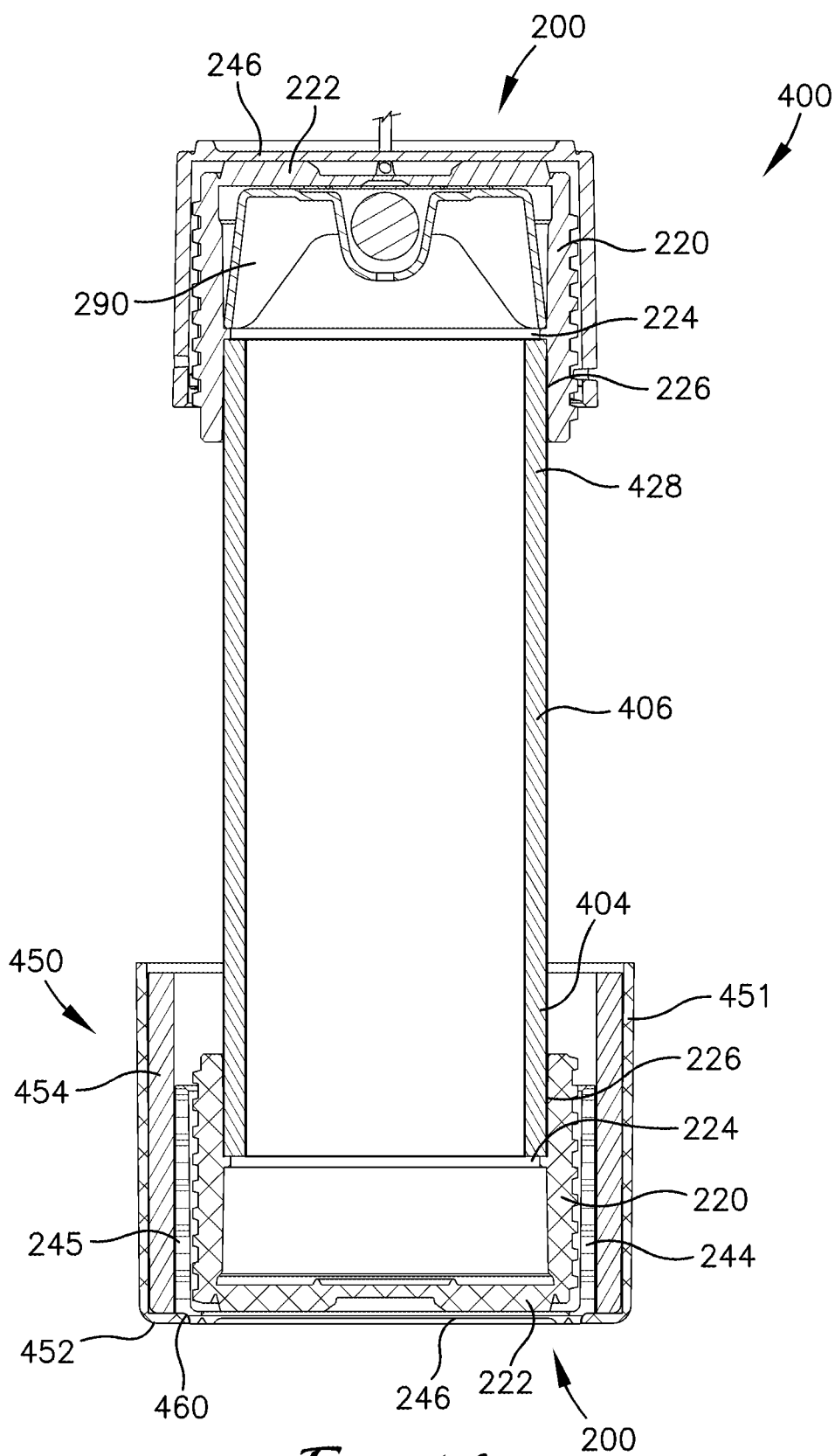
FIG. 16 is an elevational, cross-sectional view of the plumbing connecting system depicted in accordance with an exemplary embodiment and including the pressure test assembly of FIG. 14 installed in the coupling system at an upper end of the pipe as in FIG. 14 and an inverted coupling system secured on a lower end of the pipe.
Figure 17:
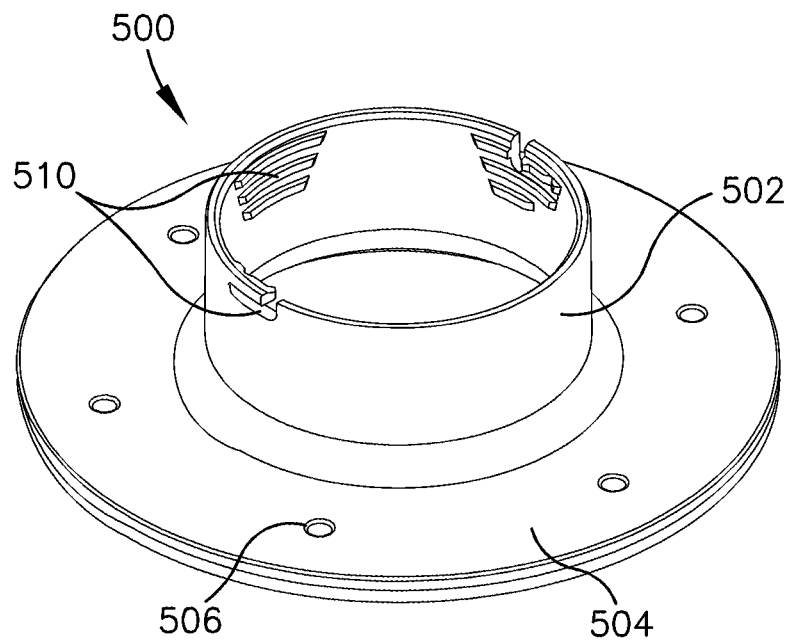
FIG. 17 is a perspective view of a flange mount depicted in accordance with an exemplary embodiment.
Figure 22:
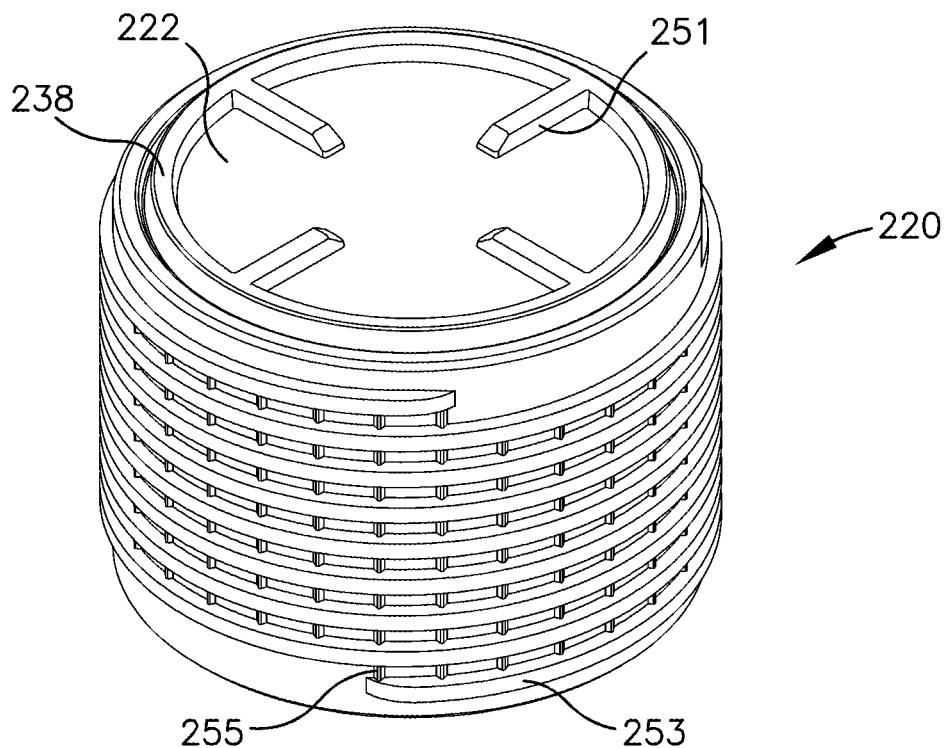
FIG. 22 is a perspective view of the coupler as shown in FIG. 18 depicted in accordance with an exemplary embodiment and having reinforcement rib members extending from a reinforcement rim.

The coupling system 200, configured substantially the same as the coupling system 200 described above, is used to connect a plumbing system in a structure to installations above the first floor. With reference to FIG. 16, in a preferred embodiment two coupling systems 200 are used in a plumbing connecting system 400 in a concrete floor installation above the first floor. As best shown in the drawings, an inverted coupling system 200 is used as a base of the plumbing connecting system 400. The inverted coupling system 200 is installed generally level with the intended bottom of the concrete slab to be installed above the first floor. The inverted coupling system 200 is secured to a layer of plywood, particle board or the like which is used as a removable form extending across the bottom of the slab to be poured thereon and may be referred to herein as a subfloor. In one embodiment, an inverted cap 244 of the inverted coupling system 200 is secured to the subfloor by fastening the inverted cap through the two marker holes 377 to the subfloor and then coupling the inverted coupler 220, as shown in FIG. 22, to the inverted cap 244 fastened to the subfloor. A proximal end 404 of a length of pipe 406 is installed in the open end of the inverted coupling system 200 adjacent the abutment ridge 224 of the inverted coupler 220 and extending upward from the inverted coupler 220. A distal end 428 of the length of pipe 406 is installed adjacent an abutment ridge 224 of a lower glue-hub 226 in an upright coupler 220 or an upright coupling system 200. The length of pipe 406 may be trimmed to a length that places a top terminal edge of the upright coupler 220 or the upright coupling system 200 at approximately an intended level of the slab to be poured. The locating device 281 may be placed in the space between the coupler knock-out 222 and the cap knock-out 246 prior to installing the cap 244 onto the upright coupler 220. Alternately, as shown in the figures, the pressure test assembly 290 may be installed in the upright coupling system 200 adapted with the purge hole 319, the marker holes 377 and the indicator whiskers 375 prior to installation of the upright coupling system 200 to the length of pipe 406.

The plumbing connecting system 400 may be adapted to create a firestop system for fire-rated floor penetrations. Intumescent material is positioned adjacent to or in surrounding relationship with the upright coupling system or adjacent to or in surrounding relationship with the inverted coupling system. In the embodiment shown in FIG. 16, the inverted coupling system 200 installed generally level with the bottom of the intended slab is positioned within an intumescent receiver 450 similar in construction with sleeve 258. The intumescent receiver 450 generally comprises a hollow body formed from a cylindrical sidewall 451. The upper end of the receiver 450 is open to allow insertion of the cap 244 and coupler 220 therein. The bottom end of the receiver 450 may include a radially inwardly projecting shoulder 452. The shoulder 452 defines an opening in the bottom end of the receiver 450 having a radial dimension equal to or just larger than an exterior radial dimension of the cap 244 such that the shoulder 452 may abut or nearly abut the exterior of the cap 244.

The sidewall 451 of the receiver 450 has interior radial dimension larger than that of the cap 244 and sufficient to receive the cap 244 and the coupler 220 coaxially within an interior thereof with a layer 454 of intumescent material positioned between the cap 244 and the receiver sidewall 451 In one embodiment, the shoulder 452 formed on the intumescent receiver 450 may extend radially inward from the bottom or proximal end of the sidewall 451 to fit on a cap groove 460 formed near the bottom-most circumferential edge of the cylindrical wall 245 of the inverted cap 244. The cap groove 460 is a circumferential, concave groove formed in the inverted cap 244 between the junction of the cylindrical wall 245 and the end of the cap, with a horizontally extending edge and a vertically extending edge. The purpose of the intumescent material as applied to the inverted coupling system 200 is to contain fire and smoke from spreading by expansion of the intumescent material into the areas enclosed by the coupler 220 or coupling system 200 upon heating the intumescent material if the pipe 406 inserted in the coupler 220 melts due to the heat of a fire.

Installation and use of the plumbing connecting system 400 in a concrete floor installation above the first floor is described in accordance with an exemplary embodiment. Installation of the plumbing connecting system 400 follows a similar process as described and detailed previously. The inverted coupling system 200 is installed generally level with the bottom of the intended slab and may be secured to a subfloor by fastening the cap 244 with fasteners driven through the marker holes 377 to the subfloor. The inverted coupling system 200 may also be secured to the intumescent receiver 450 to create a firestop system by seating the inverted cap 244 within the intumescent receiver. If the intumescent receiver 450 has an inward extending shoulder 452, the inverted cap 244 is seated within the intumescent receiver 450 such that the shoulder 452 fits on a cap groove 460 formed on the inverted cap 244, prior to securing the inverted cap 244 to the subfloor. The inverted coupler 220 of the coupling system 200 is then coupled to the inverted cap 244 that is secured to the subfloor by engaging the engagement features therebetween. The length of pipe 406 is trimmed to a length that places a top terminal edge of the upright coupler 220 or upright coupling system 200 to be installed on the distal end of the length of pipe 406 at approximately an intended level of the slab to be poured. The proximal end of the length of pipe 406 is installed in the glue-hub 226 adjacent the abutment ridge 224 of the open end of the inverted coupler 220 by gluing or otherwise affixing the length of pipe 406 to the coupler 220 in a common manner as described previously. A locating device 281 or a pressure test assembly 290 may be installed in the upright coupling system 200 prior to installation on a distal end of the length of pipe. Similar to above, the distal end of the length of pipe is glued or otherwise affixed in the lower glue-hub 226 adjacent the abutment ridge 224 of the upright coupling system 200 or upright coupler 220. Prior to a pressure test, the plumbing system is connected to the plumbing connecting system 400. The knock-out disc 222 of the inverted coupler 220 and the second knock-out disc 246 of the inverted cap 244 are removed as described previously with respect to the coupler 120 and the cap 244. The inverted coupler 220 is then coupled to and connected to the plumbing system below the flooring. A pressure test, as is known in the art, is then executed. The slab is then poured and finished, the subfloor removed and the second knock-out disc 246 and the knock-out disc 222 of the upright coupling system 200 removed. The locating device 281 or pressure test assembly 290 is then retrieved and removed from the coupler 220. When such phases of construction are reached, the plumbing connecting system 400 may be coupled to and connected to a plumbing system above the concrete slab.

As shown in FIGS. 17-20, in an alternate embodiment a flange mount 500 may be used as a base to allow direct mounting to a flooring surface, such as a wood deck or a metal deck. The flange mount 500 comprises a cylindrical body 502 and a flange 504 extending radially outward from the bottom of the cylindrical body 502. The cylindrical body 502 is formed in a variety of longitudinal lengths as is appropriate for the installation. The flange 504 has apertures 506 for securing the flange mount 500 to the flooring.

Similar to the interior surface of the cap 244, the cylindrical body 502 is provided with interior mating engagement features 510 that enable longitudinally adjustable engagement between the flange mount 500 and the coupler 220. The interior mating features discussed with reference to the cap 244 are utilized between the flange mount 500 and the coupler 220, including mating threads, pawls or a series of teeth or ridges for engaging the pawls, a bayonet-style engagement with steps or one or more frictional engagement components disposed between the cylindrical body 502 and coupler 220, among a variety of other configurations. Such an engagement enables the cylindrical body 502 and the coupler 220 to be adjusted relative to one another along a longitudinal axis to adjust an overall longitudinal length. It is to be understood that other configurations may be employed for enabling adjustability of the longitudinal length without departing from the scope described herein.

Figure 18:
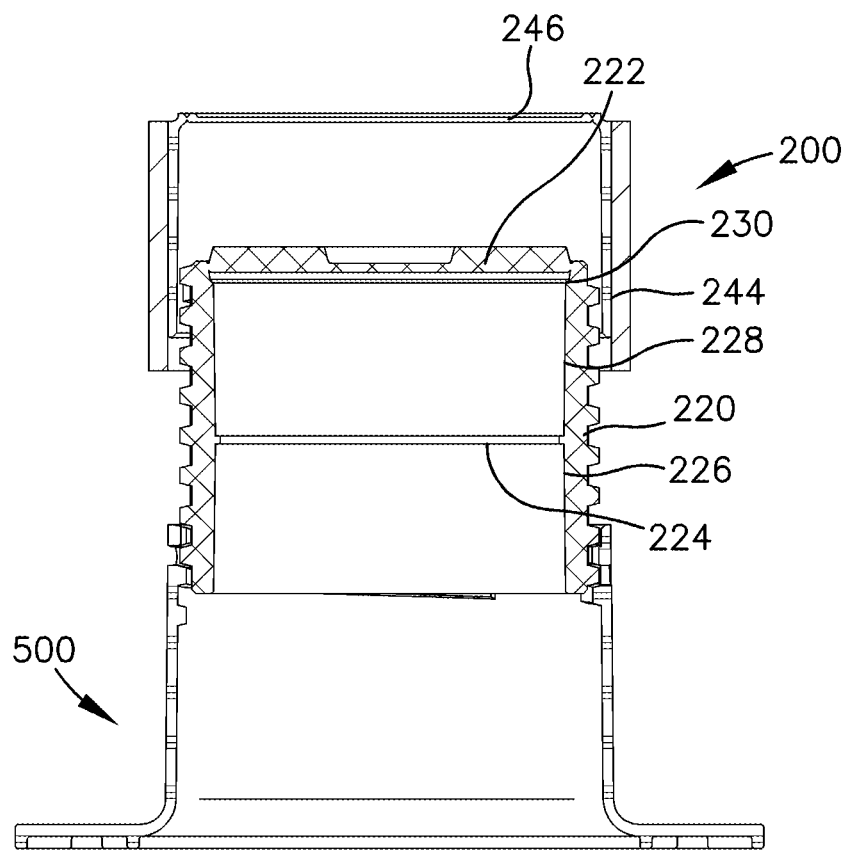
FIG. 18 is an elevational, cross-sectional view of an example of the coupling system of FIG. 5 installed in a flange mount as shown in FIG. 17.
Figure 19:
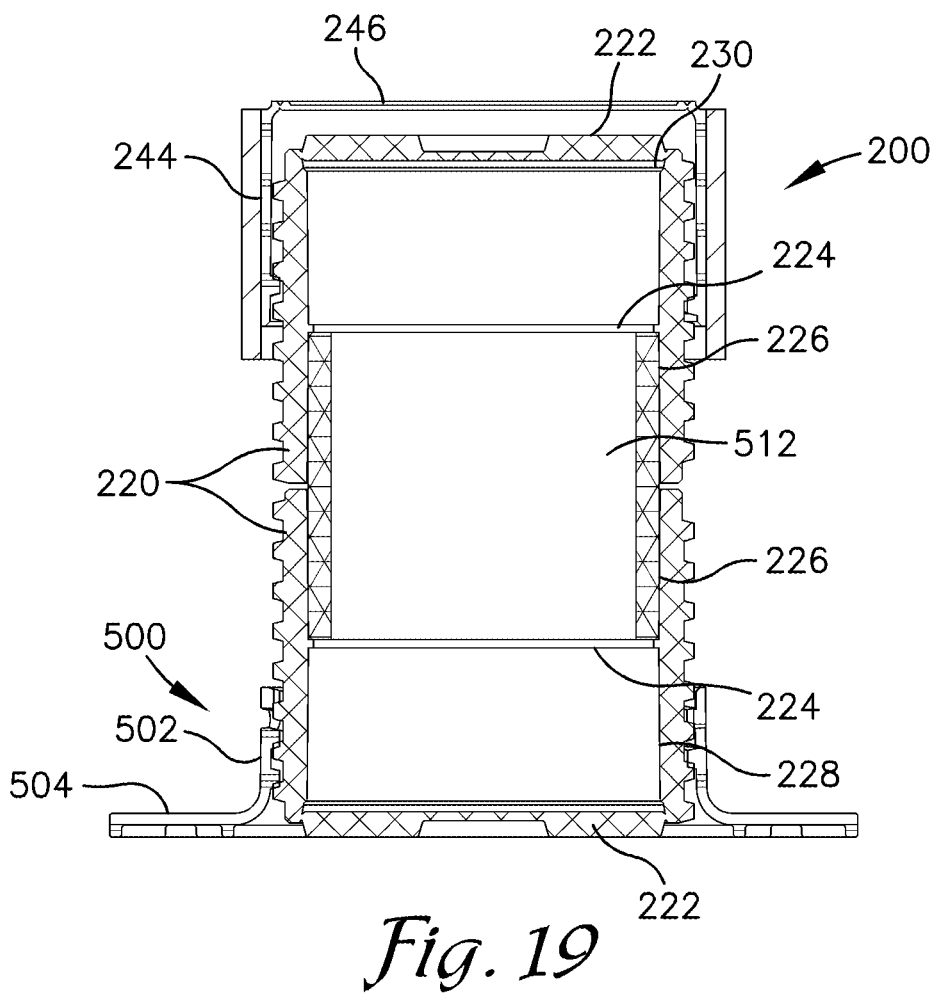
FIG. 19 is an elevational, cross-sectional view showing first and second couplers connected in vertical alignment by a short section of pipe received within aligned hubs of the first and second couplers and with the first coupler received within a flange mount of FIG. 17 with a cap and sleeve secured over and around the second coupler at an upper end thereof.
Figure 20:
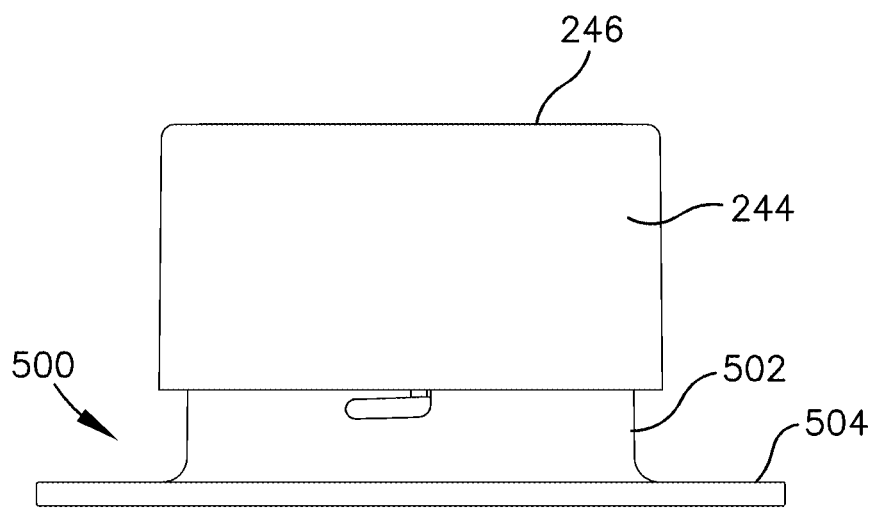
FIG. 20 is an elevational view of the coupling system as shown in FIG. 18 with the coupling system adjusted longitudinally to a minimum height.

The flange mount 500 may be employed in a variety of arrangements without departing from the scope described herein. Examples of some of the arrangements or configurations include the flange mount 500 utilized with an upright coupling system 200, wherein the coupler 220 of the upright coupling system 200 is longitudinally adjustable in relation to the flange mount 500 and is also longitudinally adjustable in relation to the cap 244 of the upright coupling system, as shown in FIGS. 18 and 20. In a configuration shown in FIG. 19, an inverted coupler 220 is mounted within the flange mount 500. A connecting pipe 512 of a determinable length is mounted within open ends and between a lower glue-hub 226 of the inverted coupler 220 (oriented above the upper glue-hub 228 thereof) and a lower glue-hub 226 of an upright coupling system 200. The connecting pipe is in abutment with the abutment ridges 224 of the inverted coupler 220 and the upright coupling system 200 and is glued or otherwise affixed to each lower glue-hub 226 in a common manner as described previously above.

With respect to the flange mount 500, the plumbing system of the structure below the flange mount 500 is connected to the flange mount 500 through the flooring, such as for pressure testing the plumbing system, in a similar manner as discussed above with regard to the coupling system 200 or the plumbing connecting system 400. The flange mount 500 is then connected to the plumbing system above the flooring by removal of the knock-out disc 222 of the upright coupler 220 and the cap knock-out 246 of the upright cap 244 as previously described with respect to the coupler 120 and the cap 244.

The coupler 120 or 220, the cap 244 and the sleeve 258 may be formed from a variety of materials including acrylonitrile butadiene styrene (ABS), polyvinyl chloride (PVC) or chlorinated polyvinyl chloride (CPVC). The material of construction of the coupler 120 or 220 preferably matches the material of construction of the pipe to which it is to be secured to facilitate gluing the like materials together. The coupler 120 or 220 and the cap 244 are preferably formed from a plastic having a brittleness that is sufficient to allow the coupler knock-out 222 or the cap knock-out 246 to be broken away from the coupler 220 or cap 244 in a single piece.

It is foreseen that the sleeve 258 could be formed from a section of conventional plastic pipe having an inside diameter corresponding to the outside diameter of the cap 244 with the section of pipe glued to the cap. For example, the cap 244 could be formed or sized to have an outside diameter sized to fit within conventional three-inch drain-waste-vent pipe (DWV pipe). The DWV pipe would be cut into sections sized at least as long as the thickness of the slab 12 to be poured around the stub-up pipe 10.

Many different arrangements of the various components depicted, as well as components not shown, are possible without departing from the scope of the description provided herein. Exemplary embodiments have been described with the intent to be illustrative rather than restrictive. Alternative embodiments will become apparent to readers of this disclosure after and because of reading it. Alternative means of implementing the aforementioned can be completed without departing from the scope of exemplary embodiments described herein. Identification of structures as being configured to perform a particular function in this disclosure is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of exemplary embodiments described herein.

What is claimed is:

1. A coupler for pipe comprising:
a coupler body formed from a cylindrical wall enclosing a hollow interior and having an abutment feature projecting inward from an inner surface of the coupler body and dividing the coupler body into a first glue-hub extending inward from a first open end of the coupler body to the abutment feature and a second glue-hub extending from the abutment feature toward a second end of the coupler body, the coupler body further includes a knock-out section extending from a distal end of the second glue-hub toward the second end of the coupler body, a diameter of an inner surface of the knock-out section is greater than a diameter of an inner surface of the second glue-hub such that a shoulder is formed between the inner surface of the knock-out section and the inner surface of the second glue-hub; a coupler knock-out member extends across and closes the second end of the coupler body and is connected to an inner surface of the coupler body along the knock-out section by a web of reduced thickness relative to the coupler knock-out member, wherein the first glue-hub is configured to receive an end of a first pipe and the second glue-hub is configured to receive an end of a second pipe when the coupler knock-out member has been removed from the second end of the coupler body.

2. The coupler for pipe as in claim 1 further comprising: a cap including a cylindrical wall enclosing a hollow interior, a first end of the cylindrical wall of the cap is open and a second end of the cylindrical wall is closed off by a cap knock-out member connected to the cylindrical wall by a web of reduced thickness relative to the cap knock-out member; an inner radial dimension of the cylindrical wall of the cap is greater than an outer radial dimension of the coupler such that the coupler is insertable into the hollow interior of the cap through the first end of the cylindrical wall of the cap; a first mating feature is included on the coupler and a second mating feature is included on the cap, the first mating feature cooperating with the second mating feature to set a vertical position of the cap relative to the coupler with the coupler extending into the cap and such that the cap knock-out member is positioned in spaced relation above the coupler knock-out member.

3. The coupler for pipe as in claim 2 wherein the first mating feature comprises a thread on an outer surface of the coupler.

4. The coupler for pipe as in claim 2 wherein the second mating feature comprises a thread on an inner surface of the cap.

5. The coupler for pipe as in claim 2 wherein the first mating feature comprises a thread on an outer surface of the coupler and the second mating feature comprises a thread on an inner surface of the cap, wherein the first thread engages the second thread and rotation of the cap relative to the coupler threadingly adjusts the vertical position of the cap relative to the coupler.

6. The coupler for pipe as in claim 5 further comprising a first locking feature on the coupler and a second locking feature on the cap, wherein engagement of the first locking feature by the second locking feature resists adjustable movement of the cap relative to the coupler.

7. The coupler for pipe as in claim 5 further comprising a plurality of spaced apart ribs formed on an outer surface of the cylindrical wall of the coupler in parallel alignment with a longitudinal axis of the coupler and a flexible pawl formed on the cap and positioned to selectively engage one of the plurality of spaced apart ribs to resist rotation of the cap relative to the coupler until sufficient rotational force is applied to the cap relative to the coupler to cause the flexible pawl to flex away from and past the rib.

8. The coupler for pipe as in claim 2 further comprising a sleeve having open upper and lower ends and a cap engaging feature projecting inward from the sleeve, wherein the sleeve is sized for positioning over and surrounding the cap with the cap engaging feature engaging a portion of the cap for supporting an upper end of the sleeve proximate an upper end of the cap.

9. The coupler for pipe as in claim 2 further comprising a sleeve having open upper and lower ends, an inner sleeve diameter that is greater than an outer diameter of the cap and a sleeve shoulder projecting radially inward from an upper end of the sleeve and circumscribing an upper opening through the sleeve, a diameter of the upper opening circumscribed by the sleeve shoulder is slightly narrower than an outer diameter of the cap such that the sleeve may be positioned in surrounding relationship over the cap with the sleeve shoulder engaging the cap to support an upper end of the sleeve proximate an upper end of the cap.

10. The coupler for pipe as in claim 9 wherein the coupler is securable to a stub-up pipe around which a slab is to be poured and the sleeve has a length at least as long as a thickness of the slab to be poured around the stub-up pipe.

11. The coupler for pipe as in claim 1 in combination with a pressure test assembly and wherein a purge opening extends through the coupler knock-out member; the pressure test assembly comprises:
a valve body having a cavity formed therein, the cavity having an upper aperture and a lower aperture, the valve body sized to be insertable into the coupler body between the abutment feature and the coupler knock-out member with the upper aperture opening toward the coupler knock-out member;
a gasket with at least one opening extending therethrough, the gasket is positionable in covering relationship with the valve body and between the valve body and the coupler knock-out member; and
a float that is less dense than water, wherein the float is located within the cavity and dimensions of the float are larger than dimensions of the lower aperture of the valve body, smaller than the dimensions of the upper aperture of the valve body and larger than a diameter of the at least one opening of the gasket.

12. The coupler for pipe in combination with the pressure test assembly of claim 11 further comprising a cap including a cylindrical wall enclosing a hollow interior a first end of the cylindrical wall of the cap is open and a second end of the cylindrical wall is closed off by a cap knock-out member connected to the cylindrical wall by a web of reduced thickness relative to the cap knock-out member; an inner radial dimension of the cap is greater than an outer radial dimension of the coupler such that the coupler is insertable into the hollow interior of the cap through the first end of the cylindrical wall of the cap; a first mating feature is included on the coupler and a second mating feature is included on the cap, the first mating feature cooperating with the second mating feature to set a vertical position of the cap relative to the coupler with the coupler extending into the cap and such that the cap knock-out member is positioned in spaced relation above the coupler knock-out member.

13. The coupler for pipe in combination with the pressure test assembly as in claim 12, wherein the cap knock-out member has at least one purge hole and an indicator marker may be installed in the at least one purge hole.

14. A coupler for pipe comprising:
a coupler body formed from a cylindrical wall enclosing a hollow interior divided into a first glue-hub extending inward from a first open end of the coupler body and a second glue-hub extending between the first glue-hub and a second end of the coupler body, the coupler body further includes a knock-out section extending from a distal end of the second glue-hub toward the second end of the coupler body, a diameter of an inner surface of the knock-out section is greater than a diameter of an inner surface of the second glue-hub such that a shoulder is formed between the inner surface of the knock-out section and the inner surface of the second glue-hub; a coupler knock-out member extends across and closes the second end of the coupler body and is connected to an inner surface of the coupler body along the knock-out section by a web of reduced thickness relative to the coupler knock-out member, wherein the first glue-hub is configured to receive an end of a first pipe and the second glue-hub is configured to receive an end of a second pipe when the coupler knock-out member has been removed from the second end of the coupler body; and a cap including a cylindrical wall enclosing a hollow interior, a first end of the cylindrical wall of the cap is open and a second end of the cylindrical wall is closed off by a cap knock-out member connected to the cylindrical wall by a web of reduced thickness relative to the cap knock-out member; an inner radial dimension of the cap is greater than an outer radial dimension of the coupler such that the coupler is insertable into the hollow interior of the cap through the first end of the cylindrical wall of the cap; a first mating feature is included on the coupler and a second mating feature is included on the cap, the first mating feature cooperating with the second mating feature to set a vertical position of the cap relative to the coupler with the coupler extending into the cap and such that the cap knock-out member is positioned in spaced relation above the coupler knock-out member.

15. The coupler for pipe as in claim 14 wherein the first mating feature comprises a thread on an outer surface of the coupler.

16. The coupler for pipe as in claim 14 wherein the second mating feature comprises a thread on an inner surface of the cap.

17. The coupler for pipe as in claim 14 wherein the first mating feature comprises a first thread on an outer surface of the coupler and the second mating feature comprises a second thread on an inner surface of the cap, wherein the first thread engages the second thread and rotation of the cap relative to the coupler threadingly adjusts the vertical position of the cap relative to the coupler.

18. The coupler for pipe as in claim 17 further comprising a first locking feature on the coupler and a second locking feature on the cap, wherein engagement of the first locking feature by the second locking feature resists adjustable movement of the cap relative to the coupler.

19. The coupler for pipe as in claim 14 further comprising a sleeve having open upper and lower ends and a cap engaging feature projecting inward from the sleeve, wherein the sleeve is sized for positioning over and surrounding the cap with the cap engaging feature engaging a portion of the cap for supporting an upper end of the sleeve proximate an upper end of the cap.

20. The coupler for pipe as in claim 14 in combination with a pressure test assembly and wherein a purge opening extends through the coupler knock-out member; the pressure test assembly comprises:

a valve body having a cavity formed therein, the cavity having an upper aperture and a lower aperture, the valve body sized to be insertable into second glue-hub and below the coupler knock-out member with the upper aperture opening toward the coupler knock-out member;

a gasket with at least one opening extending therethrough, the gasket is positionable in covering relationship with the valve body and between the valve body and the coupler knock-out member; and a float that is less dense than water, wherein the float is located within the cavity and dimensions of the float are larger than dimensions of the lower aperture of the valve body, smaller than the dimensions of the upper aperture of the valve body and larger than a diameter of the at least one opening of the gasket.

\* \* \* \* \*